(12) United States Patent
Sohani et al.

(10) Patent No.: US 11,856,044 B1
(45) Date of Patent: Dec. 26, 2023

(54) ISOLATING QOS POLICY PERFORMANCE FOR IMPROVED DATA STREAMING SYSTEMS AND APPLICATIONS

(71) Applicant: NVIDIA Corporation, Santa Clara, CA (US)

(72) Inventors: Prashant Sohani, Pune (IN); Rudragouda Pharale, San Jose, CA (US); Ajit Lalwani, San Jose, CA (US); Hassane Samir Azar, Los Altos, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 18/078,599

(22) Filed: Dec. 9, 2022

(51) Int. Cl.
G06F 13/00 (2006.01)
H04L 65/80 (2022.01)
H04L 65/752 (2022.01)

(52) U.S. Cl.
CPC .......... H04L 65/80 (2013.01); H04L 65/752 (2022.05)

(58) Field of Classification Search
CPC ....... H04L 65/80; H04L 65/752; H04L 65/75; H04L 65/60
USPC .............. 709/231, 232–235, 228, 227
See application file for complete search history.

(56) References Cited

U.S. PATENT DOCUMENTS

| | | | |
|---|---|---|---|
| 9,054,992 B2* | 6/2015 | Wright | G06F 3/0659 |
| 9,712,401 B2* | 7/2017 | Wright | H04L 41/5067 |
| 10,951,488 B2* | 3/2021 | Wright | G06F 11/3433 |
| 11,350,150 B2* | 5/2022 | Jain | H04N 21/2662 |
| 2013/0232261 A1* | 9/2013 | Wright | G06F 3/061 709/224 |
| 2015/0236926 A1* | 8/2015 | Wright | H04L 41/5009 709/224 |
| 2018/0316576 A1* | 11/2018 | Kang | H04L 41/08 |
| 2020/0127900 A1* | 4/2020 | Wright | G06F 11/3485 |
| 2021/0204011 A1* | 7/2021 | Jain | H04L 65/80 |
| 2022/0045959 A1* | 2/2022 | Chauhan | H04L 43/0894 |

* cited by examiner

*Primary Examiner* — Kenneth R Coulter
(74) *Attorney, Agent, or Firm* — Lowenstein Sandler LLP

(57) ABSTRACT

Apparatuses, systems, and techniques for isolating the performance of a quality-of-service (QoS) policy for improved data streaming systems and applications. In at least one embodiment, a metric is determined for a QoS policy used to provide an application session based on a value of at least one characteristic of the application session that reflects an impact of one or more external conditions beyond the control of the QoS policy.

20 Claims, 12 Drawing Sheets

US 11,856,044 B1

ISOLATING QOS POLICY PERFORMANCE FOR IMPROVED DATA STREAMING SYSTEMS AND APPLICATIONS

TECHNICAL FIELD

Embodiments of the disclosure generally relate to data analytics, and more specifically, to methods for isolating the performance of a quality-of-service (QoS) policy for improved data streaming systems and applications.

BACKGROUND

Cloud computing environments allow for the direct and on-demand streaming of software applications (e.g., gaming applications) onto a user device. Software applications are stored and executed in the cloud with the resultant output (e.g., gaming output) being streamed over a network (e.g., the Internet) for display on the client device of a user (e.g., a computer, a cell phone, or other electronic device). The user, in turn, may provide input or feedback through the client device (e.g., to take action in the game), which may be relayed back to the cloud for processing to produce further output, which can thereafter be relayed back to the client device for an interactive and/or user-directed experience.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
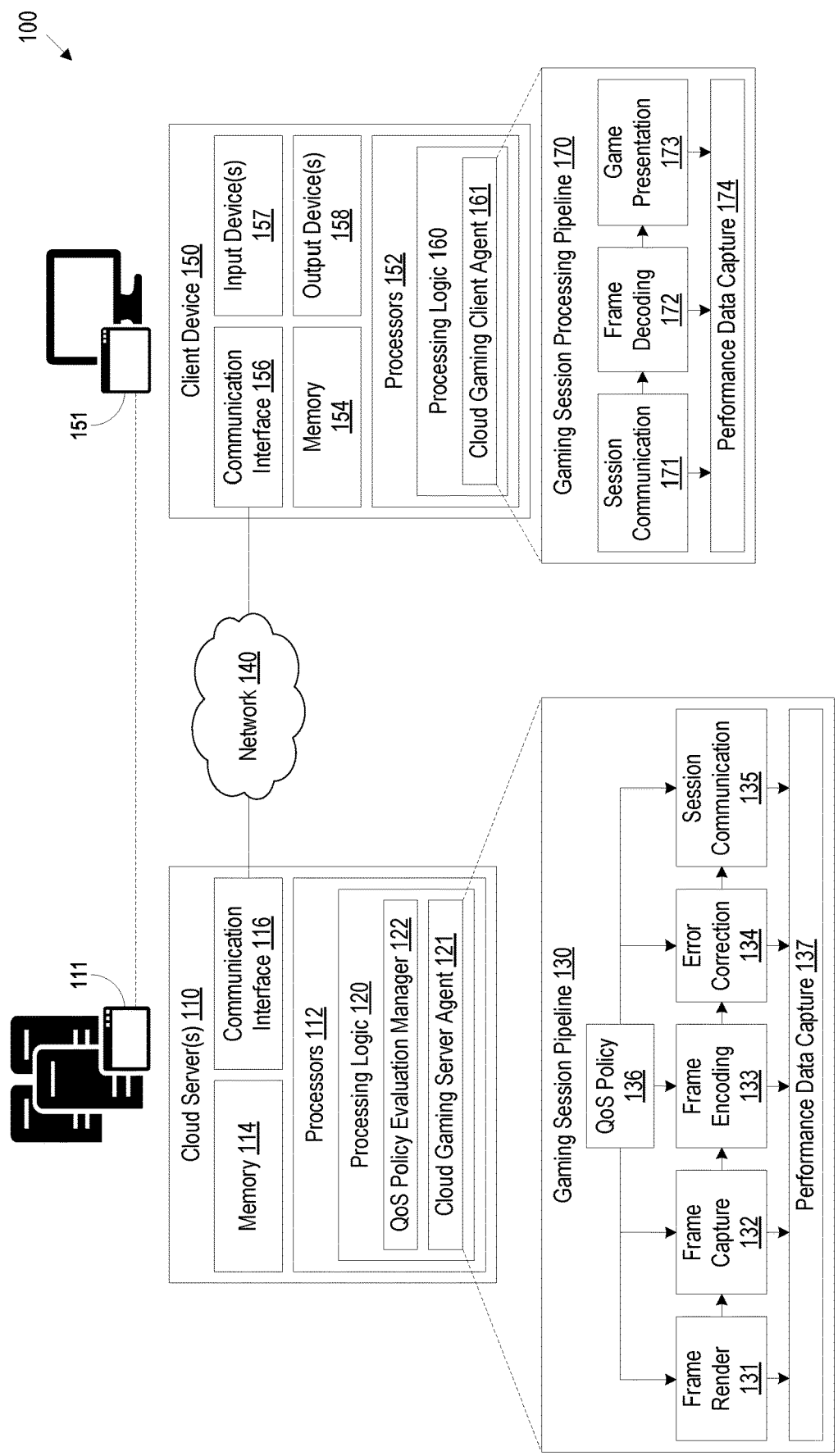
FIG. 1 illustrates an example system environment in which an application session may be conducted, according to at least one embodiment.

Software applications may be hosted on a cloud computing environment. A user can access a software application on a client device (e.g., computer, gaming console, mobile phone, smart phone, etc.) and select it for running. For example, a user can select a gaming application to run or play on their client device. A cloud-based application session such as a cloud gaming session, at a high level, involves rendering and capturing an output of the software application (e.g., of the gaming application) by a cloud server, e.g., as a series of frames, which are then encoded and packetized by the server and transmitted across a network. The client device may receive and de-packetize incoming data packets from the network to obtain the encoded frames, which may then be decoded and displayed on the client device. In some instances, a cloud gaming service may provide a cloud gaming session in accordance with a particular quality of service (QoS) policy, which may control one or more parameters used in the encoding and transmission process (e.g., video bitrate, forward-error-correct (FEC) percentage, packet pacing, etc.). The efficacy of these QoS policies is traditionally evaluated using end-to-end performance metrics, with sub-optimal QoS policies being improved by adjusting the manner in which the different encoding and transmission parameters are controlled. However, traditional end-to-end evaluation metrics can be affected by external factors that are beyond the control of the QoS policy (e.g., network conditions, game rendering issues, etc.), resulting in an incorrect assessment of the QoS policy's effectiveness and a misuse of resources in attempting to improve an already optimized QoS policy (or in neglecting to address a truly sub-optimal QoS policy).

QoS policies, for example, are generally unable to account for the effect of network conditions (e.g., network congestion, etc.). Poor network conditions, for instance, may result in a bad gaming experience, which traditional evaluation techniques may incorrectly assess as having resulted from the application of a sub-optimal QoS policy. In reality, the QoS policy may have been ideal and could not have been improved to overcome the underlying network conditions. Conversely, great network conditions may produce a good gaming experience, which may mask the use of a sub-optimal QoS policy that could be improved.

Embodiments of the present disclosure address the above-mentioned limitations in traditional QoS algorithm evaluation techniques by computing an optimality metric for an application session (e.g., a cloud gaming session) that isolates the performance of the QoS policy by discounting the effects of external factors. Accordingly, an accurate assessment of the performance of the QoS policy is provided, indicating how the QoS policy should be optimized. Optimizations of the QoS policy can then result in reduced computing and memory resources required for the encoding and transmission process used during an application session (e.g., a cloud gaming session), as well as reduced lagging and more stable network connection that lead to improved performance of the software application (e.g., the gaming application).

FIG. 1 illustrates an example system environment in which an application session may be conducted, according to at least one embodiment. As illustrated, system environment 100 may include a cloud server 110 and client device 150 that may communicate with one another over communication network 140 (e.g., including the Internet). In some embodiments, for example, cloud server 110 may host a cloud application service 111 that client device 150 may interface with using client application 151 to conduct an application session. In the illustrated embodiment, client application 151 is a client gaming application, cloud application service 111 is a cloud gaming service, and an application session is a cloud gaming session. In another illustrative example, client application 151 may be a content or asset creation application, cloud application service 111 may be a cloud-hosted, collaborative content creation service, and an application session may be a content creation application session. In yet another illustrative example, client application 151 may be a video streaming application, cloud application service 111 may be a cloud-hosted, video streaming service, and an application session may be a video streaming application session.

Cloud server 110 may include one or more processors, such as processor 112, which may be coupled to and communicate with memory 114 (e.g., volatile or non-volatile memory) and communication interface 116 (e.g., an Ethernet interface, a Wi-Fi interface, etc.). In some embodiments, cloud server 110 may be a heterogenous computing system that includes multiple types of processors, including for example, one or more central processing units (CPUs), graphics processing units (GPUs), data processing units (DPUs), digital signal processors (DSPs), field-programmable gate arrays (FPGAs), or application specific integrated circuits (ASICs). It will be appreciated that, in some embodiments, cloud server 110 may be a virtualized instance of a computer server, with the underlying hardware resources being provided by pools of shared computing resources (e.g., shared processor pools, shared memory pools, etc.) that may be dynamically allocated and accessed as needed. Processor 112 may include a number of processing logic components 120 that can be used to perform different processes and/or operations. In some embodiments, for example, the processor 112 may include cloud gaming server agent 121 and QoS policy evaluation manager 122.

In some embodiments, cloud gaming server agent 121 may be used by cloud server 110 to provide cloud gaming service 111 to users (or gaming participants). In some embodiments, for example, cloud gaming server agent 121 may provide a cloud gaming service 111 that is accessible over network 140. Cloud gaming server agent 121, for instance, may provide a cloud gaming service 111 that is publicly accessible over the Internet. In some embodiments, gaming participants may use a client application 151 (e.g., a native application, a browser-based application, etc.) running on client device 150 to interface with the cloud gaming service 111. In some embodiments, cloud gaming service 111 may facilitate a cloud gaming session where a video game application is executed on cloud server 110 and a resulting output is streamed to client application 151 for display to a gaming participant on client device 150. The gaming participant, in turn, may provide input or feedback through client application 151 (e.g., using input devices 157 of client device 150), which may be relayed back to the cloud gaming service 111 for processing.

In some embodiments, for example, a gaming participant may be able to login to cloud gaming service 111 through client application 151 and access a library of one or more video games (e.g., that they may have purchased or be able to purchase), which may be stored on cloud server 110 (e.g., in memory 114). In some embodiments, cloud gaming server agent 121 may connect with and permit access to third-party game stores (e.g., Steam, Epic Games Store, Ubisoft Connect) and video games provided therethrough. A gaming participant may select a video game from the library to play, e.g., through client application 151, which may send a request to cloud gaming service 111 to initiate a cloud gaming session for the particular video game on behalf of the user. In response to a request to initiate a cloud gaming session, cloud gaming server agent 121 may initialize a video game engine associated with the requested video game (e.g., by loading a video game application from memory 114 and executing it on processor 112) and create an instance of the video game for use with the cloud gaming session. Cloud gaming server agent 121 may initialize the video game instance, e.g., to an initial game state, and game play may begin. Cloud gaming server agent 121 may update the game state of the video game instance as game play progresses. In some embodiments, for example, cloud gaming server agent 121 may update the game state of the video game instance in response to inputs provided by gaming participants. A gaming participant, for instance, may provide inputs through client application 151 (e.g., via input device 157 of client device 150) that may be communicated to cloud gaming service 111. Cloud gaming server agent 121 may process the inputs and update the game state accordingly.

In some embodiments, cloud gaming server agent 121 may be used to implement one or more gaming session pipelines, for example, gaming session pipeline 130, which may be used to conduct a cloud gaming session (e.g., with client application 151). Gaming session pipelines may include a number of processing components that may be connected together to carry out a cloud gaming session. Each processing component may accept a number of inputs and generate a number of outputs, with the outputs of one component being provided to one or more other components to form the gaming session pipeline. The processing components may maintain one or more buffers to store the outputs generated by the components and may utilize buffers and queues to send the outputs to the next component (or components) in the processing pipeline.

Additional detail regarding the processing components and their operation is provided by way of example in the discussion herein. Gaming session pipeline 130 is not intended to represent a complete processing pipeline, and one or more additional components may be included in (and/or operations may be performed in) gaming session pipeline 130 or in addition to gaming session pipeline 130. Such additional components and/or operations may include, for example, an input processing component for processing user input received during a cloud gaming session (e.g., to update a game state of a video game instance). Such components and/or operations are not material to the understanding of the present disclosure and have been omitted for the sake of clarity and brevity. However, it should be understood that the gaming session pipeline 130 may include additional components and/or operations, which may be performed before, between, as part of, and/or after those enumerated herein.

In some embodiments, cloud gaming server agent 121 may implement gaming session pipeline 130, which at a high level may include game rendering component 131 for rendering a series of video game frames, frame capture component 132 for capturing a series of video game frames, frame encoding component 133 for encoding the captured video game frames as encoded frames, error correction component 134 for optionally generating error correction data, and session communication component 135 for packetizing and transmitting the encoded frames (and optional error correction data) to client device 150. Gaming session pipeline 130 may also include QoS policy component 126 to ensure that a cloud gaming session is provided according to a desire quality of service established by a QoS policy, and performance data capture component 127 for capturing performance data regarding a cloud gaming session.

In some embodiments, game rendering component 131 may be used to render a video game instance as a series of video game frames (e.g., including audio and video frames)

that may reflect the game state of the video game instance at specific points in time. The video game frames generated by game rendering component 131 may be stored in one or more frame buffers (e.g., in memory 114), which may be accessed by other processing components (e.g., frame capture component 132). Game rendering component 131 may render a video game instance in accordance with different rendering settings and/or parameters. For example, in some embodiments, game rendering component 131 may render a video game instance at a specified resolution and/or using different image processing techniques or enhancements (e.g., anti-aliasing, blur compensation, real-time light transport simulation, deep learning super sampling (DLSS), etc.). In some embodiments, game rendering component 131 may employ features or capabilities provided by processors of the cloud server 110 (e.g., processor 112) in rendering a video game instance. Game rendering component 131, for example, may make use of GPUs that provide hardware acceleration for certain image processing techniques or enhancements. In some embodiments, game rendering component 131 may render a video game instance at a fixed frame rate (e.g., 60 frames per second (fps)), while in others, game rendering component 131 may render a video game instance at a dynamic frame rate. In some embodiments, game rendering component 131 may ensure that a video game instance is rendered at a minimum frame rate, may limit rendering of a video game instance to a maximum frame rate, or a combination thereof. In some embodiments, QoS policy component 136 may provide some or all of the settings and/or parameters to be used by game rendering component 131, e.g., in order to achieve a desired quality of service.

In some embodiments, frame capture component 132 may be used to capture rendered video game frames (e.g., generated by game rendering component 131) for further processing, e.g., to be encoded and streamed to client device 150. In some embodiments, frame capture component 132 may detect when a video game frame is being or has been rendered, for example, by monitoring one or more frame buffers to which the video game frames may be written. In other embodiments, frame capture component 132 may receive a signal (e.g., from game rendering component 131) indicating that a video game frame is being or has been rendered. Upon detection or notification that a video game frame is being or has been rendered, frame capture component 132 may capture the video game frame, for example, by copying or moving the video game frame to one or more captured frame buffers (e.g., in memory 114) for further processing. In some embodiments, frame capture component 132 may selectively capture rendered video game frames. Frame capture component 132, for example, may operate in an asynchronous manner and capture video game frames as they are needed or capable of being processed by downstream processing components. Frame capture component 132, for instance, may capture rendered video game frames at a rate in which they can be encoded and streamed to client device 150 (e.g., using frame encoding component 133, error correction component 134, and session communication component 135). In some embodiments, QoS policy component 136 may provide some or all of the settings or parameters to be used by frame capture component 132, e.g., in order to achieve a desired quality of service.

In some embodiments, frame encoding component 133 may be used to encode captured video game frames (e.g., captured by frame capture component 132) and generate encoded frames, which may be stored in encoded frame buffers (e.g., in memory 114). In some embodiments, for example, frame encoding component 133 may encode captured video game frames into a particular format (e.g., defined by an encoding standard). In embodiments where captured video game frames include different types of frames (e.g., both audio and video frames), frame encoding component 133 may process the frame types separately. Frame encoding component 133, for instance, may encode captured video frames according to the H.264 or H.265 set of standards (e.g., into an H.264 or H.265 video format) and captured audio frames according to an MPEG standard (e.g., into an MP3 or AAC audio format). In some embodiments, frame encoding component 133 may encode video game frames as they are being captured (e.g., by frame capture component 132), which may reduce a processing delay. Frame encoding component 133 may encode the captured video game frames according to different parameters, including for example, a resolution parameter, a frame rate parameter, encoding strategy parameters (e.g., constant quantization parameter, constant bitrate (CBR), average bitrate (ABR), constant quality (CQ), constant rate factor (CRF), single-pass, multi-pass, constrained, etc.) and bitrate parameters (e.g., target bitrate, minimum bitrate, maximum bitrate, etc.). In some embodiments, frame encoding component 133 may employ features or capabilities provided by processors of the cloud server 110 (e.g., processor 112) in encoding captured video game frames. Frame encoding component 133, for example, may make use of GPUs that include hardware encoder units (e.g., H.264 or H.265 encoder units). In some embodiments, QoS policy component 136 may provide some or all of the settings or parameters to be used by frame encoding component 133, e.g., in order to achieve a desired quality of service.

In some embodiments, a cloud gaming session may be conducted over a network that does not provide for reliable data communication. Network 140, for example, may be an Internet Protocol (IP) data network that does not ensure data reliability (e.g., at or below the network communication layer). For example, data communicated over network 140 may be corrupted during transmission and/or fail to arrive altogether. In some embodiments, higher-layer communication protocols (e.g., transport control protocol (TCP)) may be used to ensure reliable data transfer, for example, through the use of a retransmission mechanism (e.g., requesting retransmission where a data packet is corrupted and/or does not arrive in a timely manner), but doing so may introduce latency to the communication. In some embodiments, error correction component 134 may be used to generate error correction data containing redundant information that can be sent alongside informational data (e.g., encoded frame data) and used to detect and correct transmission errors that may occur when communicating over network 140 (e.g., in communicating data between cloud server 110 and client device 150). In some cases, use of error correction data may minimize or obviate the need to use reliable data transfer mechanisms (e.g., retransmission schemes), thereby minimizing or avoiding any increase latency attendant thereto. In some embodiments, for example, error correction component 134 may be used to process encoded frames (e.g., generated by frame encoding component 133) to generate error correction data (e.g., forward error correction (FEC) data), which may be stored in one or more buffers (e.g., in memory 114). Error correction component 134, for instance, may employ an error correction coding scheme to generate error correction data from the encoded frames (or portions thereof). Error correction component 134, for instance, may employ a block coding technique (e.g., Hamming coding, Reed-Solomon coding, etc.), a continuous coding technique (e.g., convolutional coding), or a combination thereof. Error correction component 134 may generate error correction data according to different parameters, including for example, a coding rate that may indicate an amount of redundant information to be generated. In some embodiments, for example, the coding rate may specify a ratio between an amount of informational data (e.g., encoded frame data) and an amount of total data (e.g., encoded frame data and error correction data) to be transmitted. In other embodiments, the coding rate may be expressed as a percentage (e.g., a percent of total data) or any other suitable manner (e.g., a ratio of redundant data to total data, or the like). In some embodiments, QoS policy component 136 may provide some or all of the parameters (e.g., a coding rate) to be used by error correction component 134, e.g., in order to achieve a desired quality of service.

In some embodiments, session communication component 135 may be used to process and transmit data to client device 150, e.g., over network 140, as part of a cloud gaming session. In some embodiments, for example, session communication component 135 may be used to process and transmit encoded frame data and error correction data generated by frame encoding component 133 and error correction component 134, respectively. Session communication component 135, for instance, may generate one or more data packets that carry encoded frame data and/or error correction data as their payload. Data packets generated by session communication component 135 may be formatted in accordance with one or more communication protocols. In some embodiments, for example, data packets may be generated that conform to standard transport layer protocols, like the user datagram protocol (UDP), and network layer protocols, like the IP protocol. In practice, an individual data packet may carry a finite amount of data (e.g., according to a maximum transmission unit (MTU)), such that data for an encoded frame or error correction data block may be divided across multiple data packets. In some embodiments, the data packets generated by session communication component 135 may be stored in one or more transmission buffers (e.g., in memory 114). In some embodiments, session communication component 135 may maintain a queue, specifying an order in which data packets are to be transmitted (or placed) onto network 140. In some cases, session communication component 135 may operate to transmit data packets as quickly as possible, while in others, session communication component 135 may control a rate at which the data packets are placed onto network 140 (or a packet pacing). In some embodiments, packet pacing may be employed to decrease the likelihood or amount of packet loss and/or jitter in a communication link (e.g., between cloud server 110 and client device 150). In some embodiments, QoS policy component 136 may provide some or all of the parameters (e.g., a packet pacing) to be used by session communication component 135, e.g., in order to achieve a desired quality of service.

In some embodiments, QoS policy component 136 may be used to ensure a cloud gaming session is provided according to a desired quality of service, e.g., established by a QoS policy, with respect to one or more characteristics of a cloud gaming session (e.g., video quality, stutters, latency, etc.). Generally speaking, for example, a QoS policy may be used to ensure that a cloud gaming session has high video quality, a minimal amount of stuttering, and low latency. However, given external constraints on conducting a cloud gaming session (e.g., limited channel bandwidth), a tradeoff may need to be made between different characteristics (e.g., sacrificing latency for improved video quality). In some embodiments, a QoS policy may give each characteristic equal priority, while in others, the QoS policy may prioritize one characteristic over another. Some gaming participants, for instance, may perceive video quality to be the most important aspect of a cloud gaming session (e.g., when playing a flight simulator), while others may find their experience to be most impacted by latency (e.g., when playing a first-person shooter). In some embodiments, a gaming participant may be able to provide their preference as to the relative importance of different characteristics through client application 151. A gaming participant, for instance, may be able to select between different user experience presets (e.g., between "Highest Quality," "Smoothest Gameplay," or "Most Responsive" presets).

In some embodiments, QoS policy component 136 may affect a particular QoS policy by controlling one or more parameters of a cloud gaming session (for convenience, "control parameters" or "gaming session parameters"). In some cases, the QoS policy may provide a set of rules or logic that QoS policy component 136 may apply in controlling cloud gaming session parameters. QoS policy component 136, for example, may control one or more parameters used in the encoding and transmission process (e.g., video bitrate, forward-error-correct (FEC) percentage, packet pacing, etc.) to best achieve the desired characteristics for the cloud gaming session. For instance, in some embodiments, QoS policy component 136 may proscribe the settings or parameters used by different processing components of the cloud server 110 (e.g., by game rendering component 131, frame capture component 132, frame encoding component 133, error correction component 134, and/or session communication component 135). As noted above, in some embodiments, a QoS policy may prioritize characteristics of a cloud gaming session differently, and QoS policy component 136 may determine control parameters accordingly. In some cases, the relative priority of different characteristics may be reflected in the rules or logic provided in the QoS policy for controlling gaming session parameters.

In some embodiments, a QoS policy may identify additional factors for QoS policy component 136 to consider in determining control parameters for a cloud gaming session (e.g., in the rules or logic provided for controlling gaming session parameters). In some embodiments, QoS policy component 136 may consider the capabilities of cloud server 110 in determining control parameters for a cloud gaming session. QoS policy component 136, for example, may determine whether cloud server 110 supports hardware accelerated rendering and/or encoding of video game frames (e.g., by processor 112), based on which QoS policy component 136 may determine appropriate rendering and encoding settings.

In some embodiments, QoS policy component 136 may consider the capabilities of client device 150 in determining control parameters for a cloud gaming session. In some embodiments, for example, QoS policy component 136 may create a device profile for client device 150 when communication is first established with cloud gaming service 111, which may identify relevant capabilities of client device 150. The device profile, for example, may indicate whether client device 150 supports hardware accelerated video decoding (e.g., through a discrete or integrated GPU). QoS policy component 136 may adjust encoder settings accordingly (e.g., to enable or disable computationally intensive encoder settings).

In some embodiments, QoS policy component 136 may consider qualities of network 140 or communication channels established thereon in determining the control parameters of a cloud gaming session. In some embodiments, for instance, QoS policy component 136 may establish and test a connection (or communication channel) between client device 150 and cloud server 110 (e.g., when communication is first established with cloud gaming service 111) and determine one or more qualities regarding the connection therebetween. QoS policy component 136, for example, may determine a channel bandwidth, an end-to-end latency, or the like. QoS policy component 136 may use the determined connection qualities in determining control parameters for the cloud gaming session. By way of example, QoS policy component 136 may determine an available channel bandwidth (e.g., Mbps), based on which QoS policy component 136 may determine a packet transmission rate (e.g., number of packets per second). QoS policy component 136 may then determine a number of packets to be allocated towards encoded frame data and a number of packets to be allocated for error correction data, based on which QoS policy component 136 may determine control parameters for generating encoded frames (e.g., a resolution, a frame rate, a bitrate, etc.) and error correction data (e.g., a coding rate). As noted above, in some embodiments, a QoS policy may prioritize characteristics of a cloud gaming session differently, for example, prioritizing video quality over latency. QoS policy component 136 may allocate the number of packets and determine control parameters accordingly, for instance, resulting in a relatively higher bitrate and lower coding rate (e.g., as compared to a QoS policy where both characteristics are given equal priority).

In some embodiments, control parameters may be changed or adjusted throughout the course of the cloud gaming session (e.g., in accordance with the rules or logic provided in a QoS policy). In some embodiments, for example, QoS policy component 136 may determine control parameters dynamically at particular intervals or as needed by other processing components of cloud server 110. In some embodiments, QoS policy component 136 may determine control parameters based on a state of cloud servers 110, network 140, and/or client device 150. In some embodiments, for example, QoS policy component 136 may analyze performance data captured during a cloud gaming session (e.g., by performance data capture component 137) to determine a performance state of cloud servers 110, network 140, and/or client device 150 based on which QoS policy component 136 may adjust control parameters of the cloud gaming session. In some embodiments, for instance, QoS policy component 136 may analyze performance data related to cloud server 110 and/or client device 150 to determine if a utilization rate of device resources (e.g., a utilization rate of a memory, CPU, GPU, or other processor) is elevated or remains elevated for an extended period of time, as this may result in dropped frames (e.g., during rendering or encoding at cloud server 110, or when decoding and rendering at client device 150). In such cases, QoS policy component 136 may adjust control parameters to alleviate the stress (e.g., decreasing a resolution, frame rate, etc.). In some embodiments, QoS policy component 136 may analyze performance data captured during a cloud gaming session to determine qualities of the communication channel established over network 140 between client device 150 and cloud server 110 (or changes therein) and adjust control parameters accordingly. QoS policy component 136, for instance, may detect a change in a communication channel bandwidth or latency, and adjust encoding parameters (e.g., adjusting a resolution, frame rate, bitrate, etc.) and/or error correction coding parameters (e.g., a coding rate) in response thereto.

In some embodiments, performance data capture component 137 may be used to capture performance data regarding a cloud gaming session, which may be stored in memory 114 for use by other processing components of cloud server 110 (e.g., QoS policy component 136, QoS policy evaluation manager 122, etc.). In some embodiments, for example, performance data capture component 137 may capture data regarding processing performed by cloud server 110 and its various processing components (e.g., by client gaming service agent 121 including game rendering component 131, frame capture component 132, frame encoding component 133, error correction component 134, session communication component 135, etc.). In some embodiments, for example, performance data capture component 137 may capture data regarding the generation, transmission, and/or other processing of data, including for example, identifiers associated with generated data or portions thereof (e.g., video game frame identifier, captured video game frame identifier, encoded frame identifier, error correction data block identifier, packet identifier, etc.), timing information associated with the generation, transmission, or other processing of data (e.g., a timestamp for the start and/or end of processing), and/or the settings and parameters associated with generating, transmitting, or otherwise processing the data or portions thereof (e.g., a resolution, frame rate, bitrate, coding rate, etc.). In some embodiments, performance data capture component 137 may capture data regarding a state of cloud server 110 and its components during a cloud gaming session. In some embodiments, for example, performance data capture component 137 may capture data regarding a utilization rate of processor 112, memory 114 and/or network interface 116. Performance data capture component 137 may capture utilization data at regular intervals and/or contemporaneous with processing performed by the various processing components (e.g., contemporaneous with rendering or encoding video game frames). In some embodiments, performance data capture component 137 may capture data regarding errors or other significant processing events (e.g., frame drops, etc.), including for example, the type of error or processing event and details regarding the error or processing event (e.g., a frame identifier of the dropped frame, a reason for the frame drop, etc.).

In some embodiments, performance data capture component 137 may capture performance data provided by network 140 (e.g., by network nodes comprising network 140). For example, in some embodiments, a cloud gaming service may make use of a content delivery network (CDN) deployed within network 140 to facilitate a cloud gaming session. Nodes within the content delivery network may be configured to capture performance data regarding a cloud gaming session conducted over the CDN, which may be sent to cloud server 110 during and/or following completion of a cloud gaming session. In some embodiments, for example, network nodes may provide data regarding the cloud gaming session being conducted (e.g., packet timing information, bandwidth usage, transmission delay, etc.) and/or a state of the network generally (e.g., link utilization, queue depth, etc.).

In some embodiments, performance data capture component 137 may capture performance data provided by client device 150. For example, as discussed below, client device 150 may capture performance data regarding a cloud gaming session, which may be sent to cloud server 110 during and/or following completion of a cloud gaming session. In some embodiments, for example, client device 150 may provide data regarding processing performed by client device 150 and its various processing components (e.g., by cloud gaming client agent 161 including session communication component 171, frame decoding component 172, and game presentation component 173, etc.). In some embodiments, client device 150 may provide data regarding a state of client device 150 and its components (e.g., processor, memory, and/or network utilization while receiving and decoding a video stream). In some embodiments, for example, client device 150 may provide data regarding inbound packets received from cloud server 110 as part of a cloud gaming session, including for instance, a packet identifier, packet size, arrival time, and payload description (e.g., an identifier of an encoded frame or error correction data block, or portion thereof, contained in the packet payload). In some embodiments, client device 150 may provide data regarding errors or other significant processing events, including for example, the type of error or processing event and details regarding the error or processing event. Client device 150, for instance, may capture performance data regarding frame drops experienced during the cloud gaming session, including for example, a frame identifier of the dropped frame, when the frame drop was experienced, and a reason for the frame drop (e.g., encoded frame data was not received and/or could not be recovered in time, encoded frame data could not be decoded and displayed in time, etc.).

In some embodiments, performance data capture component 137 may associate different elements of performance data with one another. In some embodiments, for example, performance data capture component 137 may associate different elements of performance data with a corresponding frame of a cloud gaming session, e.g., with its encoded frame identifier. By way of example, for each frame of a cloud gaming session (e.g., having an associated encoded frame identifier), performance data capture component 137 may not only identify elements of performance data associated with generating the encoded frame (e.g., timing information, encoding settings or parameters, etc.) but also identify performance data associated with upstream and downstream processing of the frame by cloud server 110, network 140, and/or client device 150. In this way, performance data elements may be directly or indirectly associated with a frame of a cloud gaming session, allowing for a frame-by-frame analysis of performance data for a cloud gaming session (e.g., by QoS policy evaluation manager 122).

In some embodiments, performance data capture component 137 may derive additional performance data, e.g., from other elements of performance data captured by cloud server 110 and/or provided by client device 150. In some embodiments, for instance, performance data capture component 137 may determine a processing delay (or stack delay) introduced by some or all of the processing performed by processing components of the cloud server 110 and/or client device 150 (e.g., based on timing information associated with the processing). In some embodiments, performance data capture component 137 may determine a transmission delay (e.g., a one-way delay (OWD) or round-trip delay (RTD)) for data communicated on a communication channel (e.g., established over network 140) between cloud server 110 and client device 150. Performance data capture component 137, for instance, may compare packet transmission times (e.g., captured by cloud server 110) with packet arrival times (e.g., captured by client device 150) to determine a transmission delay for the communication channel. In some embodiments, performance data capture component 137 may determine a transmission delay on a per frame basis. Performance data capture component 137, for example, may determine a OWD for transmission of an encoded frame by comparing a transmission time of a first packet carrying the encoded frame (e.g., from cloud server 110) with an arrival time of a last packet carrying the encoded frame (e.g., at client device 150). In some embodiments, performance data capture component 137 may estimate a channel bandwidth for a communication channel between cloud server 110 and client device 150. Performance data capture component 137, for example, may consider how long it took for a number of data packets to reach client device 150 (e.g., the OWD in transmitting an encoded frame from cloud server 110 to client device 150) along with the aggregate size of the data packets (e.g., the packetized size of the encoded frame) and estimate the channel bandwidth (e.g., as an inverse ratio of the two).

In some embodiments, performance data capture component 137 may filter performance data elements (e.g., performance data elements captured by cloud server 110 or client device 150) to derive additional performance data. For example, in some cases, elements of performance data may be noisy, volatile, or sporadic in nature (e.g., transmission delay data, frame drop data, channel bandwidth data, bitrate data, etc.), and in some embodiments, performance data capture component 137 may operate to smooth, accumulate, normalize, or otherwise filter the performance data. Performance data capture component 137, for example, may determine a moving average or accumulate a performance data element by applying an infinite impulse response (IIR) filter over a particular period of time (e.g., over a window of n frames). Depending on the embodiment, the determination may be backward-looking (e.g., considering performance data elements associated with historical frames) and/or forward-looking (e.g., considering performance data elements associated with future frames). By way of example, in some embodiments, performance data capture component 137 may determine an average transmission delay by applying an IIR filter to per-frame transmission delay (e.g., OWD of an encoded frame) over a particular window of time (e.g., over the previous 150 frames). In some embodiments, performance data capture component 137 may determine a number of frame drops experienced by applying an IIR filter over a particular window of time (e.g., over 300 previous frames and 300 future frames).

In some embodiments, performance data capture component 137 may filter performance data elements to isolate their transient and/or steady-state components. Performance data capture component 137, for example, may determine whether there are sudden changes or spikes in one or more performance data elements (e.g., spikes in transmission delay, etc.). For instance, in some embodiments, performance data capture component 137 may compute a gradient (or rate of change) of different performance data elements. Performance data capture component 137, for example, may identify a transmission delay spike by computing a gradient of a per-frame transmission delay (e.g., between a current frame and a previous frame). In some cases, performance data elements may be expected to gradually change over time, and so in some embodiments, performance data capture component 137 may identify a sudden change or spike in a performance data element by computing a gradient (or rate of change) of a performance data element relative to a smoothed version of the performance data element. Performance data capture component 137, for instance, may compute a gradient of the difference between a per-frame transmission delay and an average per-frame transmission delay (e.g., taken over the previous 150 frames). In some embodiments, performance data capture component 137 may further filter the gradient results, for example, by clipping the results (e.g., adjusting values below a threshold to a minimum value and values above the same or a different threshold to a maximum value).

In some embodiments, cloud server 110 may include QoS policy evaluation manager 122 that may be used by cloud server 110 to evaluate an optimality of a QoS policy used to provide a cloud gaming session (e.g., carried out between cloud server 110 and client device 150). In doing so, QoS policy evaluation manager 122 may consider different characteristics of the cloud gaming session that the QoS policy sought to affect (e.g., video quality, amount of stutter, latency, etc.). In some embodiments, QoS policy evaluation manager 122 may evaluate the optimality of a QoS policy at or across one or more instances or points in time. In some embodiments, for example, QoS policy evaluation manager 122 may evaluate the optimality of a QoS policy with respect to each frame of the cloud gaming session. In some embodiments, QoS policy evaluation manager 122 may additionally, or alternatively, evaluate a QoS policy across a finite period of time (e.g., across a window of 5 minutes or 9,000 frames) or as a whole (e.g., across all frames of the cloud gaming session). In some embodiments, QoS policy evaluation manager 122 may evaluate an optimality of a QoS policy in real time as the cloud gaming session is conducted. In some embodiments, QoS policy evaluation manager 122 may initiate evaluation of a QoS policy after a set period of time has passed (e.g., after 5 minutes has passed or 9,000 frames has been transmitted and/or received). In some embodiments, QoS policy evaluation manager 122 may, additionally or alternatively, evaluate an optimality of a QoS policy after the cloud gaming session has concluded.

In some embodiments, QoS policy evaluation manager 122 may evaluate the optimality of a QoS policy with respect to a particular gaming session parameter controlled by the QoS policy (e.g., bitrate, FEC percentage, packet pacing, etc.). In some embodiments, QoS policy evaluation manager 122 may consider the impact the control parameter may have on different characteristics of the cloud gaming session that the QoS policy sought to affect (e.g., video quality, amount of stutter, latency, etc.). As an illustrative example, QoS policy evaluation manager 122 may be used to evaluate the optimality of a QoS policy with respect to video bitrate. QoS policy evaluation manager 122, for instance, may look to see whether an appropriate bitrate was employed during the cloud gaming session. In some embodiments, for example, QoS policy evaluation manager 122 may look to see whether an appropriate bitrate (e.g., a highest possible bitrate) was maintained throughout the cloud gaming session in the absence of external factors (e.g., impairment in the underlying network). In some embodiments, QoS policy evaluation manager 122 may additionally (or alternatively) look to see whether the bitrate was appropriately adjusted during the cloud gaming session, for example, whether the bitrate was reduced in response to detection of network impairments or increased in response to a determination that the network impairments had dissipated.

In some embodiments, QoS policy evaluation manager 122 may evaluate the optimality of the QoS policy by analyzing performance data associated with the cloud gaming session (e.g., captured by performance data capture component 137). QoS policy evaluation manager 122, for example, may analyze performance data of a cloud gaming session to determine whether one or more characteristics of the cloud gaming session are inconsistent with use of an optimized QoS policy. QoS policy evaluation manager 122, for example, may evaluate the optimality of a QoS policy with respect to the video quality, number of stutters (or stutters), and latency experienced during a cloud gaming session. In some embodiments, for instance, QoS policy evaluation manager 122 may consider whether one or more performance indicators (e.g., in the performance data) associated with each characteristic are inconsistent with use of an optimized QoS policy. QoS policy evaluation manager 122, for example, may consider bitrate, frame drops, and transmission delay spikes during a cloud gaming session to assess the video quality, stutters, and latency of a cloud gaming session, respectively.

In some cases, QoS policy evaluation manager 122 may determine whether a performance indicator is inconsistent with use of an optimized QoS policy by comparing a performance indicator to an optimized performance indicator, e.g., that would have been expected under an optimized QoS policy. QoS policy evaluation manager 122, for example, may compare an actual bitrate (e.g., based on an actual number of bits used for an encoded frame) to an optimized bitrate that would have been expected under an optimized QoS policy. By way of example, an optimized bitrate may be the highest possible bitrate that can be used while ensuring that other quality constraints are not compromised, e.g., without resulting in an excessive amount of frame drops (e.g., n frame drops per second or minute).

In some embodiments, QoS policy evaluation manager 122 may use performance data for a cloud gaming session (e.g., captured by performance data capture component 137) to determine the optimized performance indicator (e.g., an optimized bitrate). As an illustrative example, because frame drops frequently occur when available channel bandwidth is exceeded, in some embodiments, QoS policy evaluation manager 122 may model a relationship between estimated channel bandwidth and frame drops experienced over a particular period of time (e.g., across a suitable number of frames, for instance, 900 frames). QoS policy evaluation manager 122, for instance, may generate a histogram of estimated channel bandwidth and frame drops experienced and determine a statistical model that fits the histogram (e.g., a Gaussian distribution that best fits the histogram). In some embodiments, the relationship modeled by QoS policy evaluation manager 122 may be backward-looking, (e.g., modeled based on performance data for prior frames), while in others, it may (additionally or alternatively) be forward-looking (e.g., modeled based on performance data of future frames). It will be appreciated that modeling the relationship in a forward-looking manner may be performed in embodiments where QoS policy evaluation manager 122 initiates evaluation of a QoS policy after a set period of time has passed (e.g., after a delay sufficient to model the relationship) or after the cloud gaming session has concluded.

QoS policy evaluation manager 122 may use the modeled relationship to determine an optimized bandwidth utilization, for example, at or below which the likelihood of experiencing an excessive number of frame drops is sufficiently low (e.g., is a 3-sigma event). In some embodiments, the number of frame drops considered excessive may depend on a relative priority of a stutters experienced characteristic in a QoS policy (e.g., with a higher priority corresponding to a lower number of frame drops and vice versa). QoS policy evaluation manager 122 may then determine the highest bitrate possible for the optimized bandwidth utilization that was determined (e.g., similar to the manner described with respect to QoS policy component 136), which in some embodiments, may be treated as the optimized bitrate. In some embodiments, QoS policy evaluation manager 122 may adjust the determined bitrate so as to avoid a sudden and/or drastic change in bitrate, which may be visually undesirable to gaming participants (e.g., resulting in a blurry image and/or forcing a decrease in frame resolution). QoS policy evaluation manager 122, for example, may limit or otherwise control the rate of change in bitrate (e.g., limiting an amount of change in bitrate relative to one or more previous frames) to arrive at the optimized bitrate.

In some embodiments, QoS policy evaluation manager 122 may consider an encoder utilization ratio in determining an optimized bitrate. The encoder utilization ratio, for example, may be a ratio of the actual bitrate of an encoded frame (e.g., based on the actual number of bits used to encode a frame) to a target bitrate used when encoding the frame (e.g., as a control parameter to frame encoding component 133) and may reflect a complexity of the scene being encoded. A static scene in a video game (e.g., while at a pause screen or in a gaming menu), for instance, may be encoded using relatively little data (e.g., at a low actual bitrate) compared to a target bitrate of the encoder, such that the encoder utilization ratio is small. In such cases, an optimized bitrate may be one that produces an encoder utilization ratio close to 1 (e.g., that matches an actual bitrate). In this way, the likelihood of experiencing frame drops may be reduced when the cloud gaming session transitions back to an active scene, as this might generate a burst of data traffic (e.g., if the target bitrate is too high). Once the cloud gaming session has transitioned to active, the optimized bitrate may transition back up to a highest bitrate possible for a determined optimized bandwidth utilization.

In some embodiments, QoS policy evaluation manager 122 may determine an amount of inconsistency in a performance indicator, which may be helpful in identifying significant issues in the QoS policy that require attention. Minor inconsistencies (e.g., small differences between an actual bitrate and an optimized bitrate) and/or sparsely occurring inconsistencies (e.g., brief reduction in bitrate, single frame drop, brief spike in transmission delay, etc.), for instance, may not have a significant impact on the experience of a gaming participant and thus may not need to be addressed (e.g., by modifying the QoS policy). In some embodiments, QoS policy evaluation manager 122 may consider a magnitude of the inconsistency, a duration of the inconsistency, a frequency of the inconsistency (e.g., within a particular window of time), or a combination thereof when determining an amount of inconsistency in a performance indicator. In some embodiments, for example, QoS policy evaluation manager 122 may determine an amount of inconsistency in bitrate (and by association, video quality) by determining a bitrate deficiency for each frame of a cloud gaming session (e.g., a difference between an actual bitrate and an optimized bitrate). In some embodiments, determining an amount of inconsistency may involve determining a count (e.g., number of frame drops) or computing an average (e.g., average transmission delay) over a particular period of time (e.g., across n frames). In some embodiments, for example, QoS policy evaluation manager 122 may apply an infinite impulse response (IIR) filter over a particular period of time (e.g., similar to the manner described with respect to performance data capture component 137). QoS policy evaluation manager 122, for instance, may determine an amount of inconsistency in frame drops as a total number of frame drops experienced over a particular window of time (e.g., over a previous 900 frames). QoS policy evaluation manager 122, likewise, may determine an amount of inconsistency in transmission delay as an average of the transmission delay spikes (e.g., a gradient of transmission delay relative to an average transmission delay) experienced over a particular window (e.g., over a previous 600 frames).

In some embodiments, QoS policy evaluation manager 122 may determine whether and/or how much of an inconsistency was the result of a suboptimal QoS policy or some external factors or conditions that may be beyond the control of the QoS policy (e.g., game render or capture delays, network congestion or other network conditions, decoding or display issues, etc.). In some embodiments, this determination may be expressed as a probability or likelihood that the inconsistency resulted from an external condition. In some embodiments, QoS policy evaluation manager 122 may make this determination based on a correlation between the observed inconsistency and a metric associated with the external factor. By way of example, QoS policy evaluation manager 122 may determine whether an inconsistency in a performance indicator was the result of underlying network conditions by examining a network metric (or change or spike therein) that may be correlated with the observed inconsistency.

In some embodiments, for instance, QoS policy evaluation manager 122 may determine whether an inconsistency with respect to bitrate, frame drops, or transmission delay spikes is the result of network congestion by examining a network queue depth. Since some level of network queue depth may be expected, QoS policy evaluation manager 122 may examine network queue depth to identify sudden changes or spikes therein, which may be correlated with experiencing such inconsistencies. For example, when a network is congested, the transmit and receive queues of individual network nodes (e.g., routers, switches, gateways, etc.) in the network may grow significantly, increasing a transmission delay through the node, or become saturated altogether, resulting in dropped packets. In some cases, changes or spikes in network queue depth may have compounding effect, and in some embodiments, QoS policy evaluation manager 122 may consider the amount of change in network queue depth over a period of time, which may be better correlated with experiencing an inconsistency.

In some embodiments, a network queue depth may be provided by individual network nodes (e.g., nodes of a CDN deployed in network 140). In other embodiments, QoS policy evaluation manager 122 may be able to estimate network queue depth, for example, using performance data for the cloud gaming session, a machine learning model or other artificial intelligence (AI) model, or some other approach. In some embodiments, for instance, QoS policy evaluation manager 122 may analyze performance data of a cloud gaming session to estimate a network queue depth at particular points of time (e.g., for each frame of the cloud gaming session). QoS policy evaluation manager 122, for example, may estimate a network queue depth based on transmission delays (e.g., a packet transmission delay, per-frame transmission delay, and/or other performance data elements) captured in the performance data. A large transmission delay, for example, may generally reflect a large network queue depth and vice versa. In some embodiments, QoS policy evaluation manager 122 may estimate a network queue depth based on a machine learning model, for example, a supervised learning model trained with data from simulated cloud gaming sessions where a network queue depth is known (e.g., conducted on a network testbed where a network queue depth may be provided by individual network nodes).

In some embodiments, QoS policy evaluation manager 122 may determine whether there are sudden changes or spikes in the network queue depth by computing a gradient (or rate of change) (e.g., between a current frame and a previous frame) of the estimated network queue depth, itself or relative to a smoothed version of the estimated network queue depth. QoS policy evaluation manager 122, for example, may smooth the estimated network queue depth by determining an average network queue depth over a particular window of time (e.g., across n frames). QoS policy evaluation manager 122, for instance, may determine an average network queue depth by applying an IIR filter to the estimated network queue depth over a number of frames (e.g., over 150 previous frames). In some embodiments, QoS policy evaluation manager 122 may further filter the gradient results, for example, by clipping the results. Furthermore, because in some cases changes or spikes in network queue depth may have compounding effect, in some embodiments, QoS policy evaluation manager 122 may consider an aggregate change or spike in network queue depth over a particular period of time. QoS policy evaluation manager 122, for instance, may apply an IIR filter to the gradient results (or the clipped gradient results) over a number of frames (e.g., over the previous 150 frames) to determine an aggregate change or spike in network queue depth.

In some embodiments, QoS policy evaluation manager 122 may be used to determine one or more optimality metrics for a QoS policy used to carry out a cloud gaming session (e.g., carried out between cloud server 110 and client device 150). In some embodiments, QoS policy evaluation manager 122 may determine optimality metrics for a QoS policy with respect to a cloud gaming session parameter controlled by the QoS policy (e.g., a QoS bitrate policy optimality metric). In some embodiments, optimality metrics determined by QoS policy evaluation manager 122 may include one or more components, for example, corresponding to the different characteristics of the cloud gaming session that the QoS policy sought to affect (e.g., a video quality component, an amount of stutter component, a latency component, etc.).

In some embodiments, QoS policy evaluation manager 122 may determine an optimality metric at or across one or more instances or points in time and/or for the cloud gaming session as a whole. In some embodiments, for example, QoS policy evaluation manager 122 may determine an optimality metric for each frame of a cloud gaming session (e.g., a per-frame optimality metric) along with an optimality metric across some or all frames of the cloud gaming session (e.g., a session-level optimality metric), each of which may include one or more components (e.g., corresponding to different characteristics of the cloud gaming session). By way of example, in some embodiments, QoS policy evaluation manager 122 may determine per-frame video quality, stutter, and latency metrics, which QoS policy evaluation manager 122 may use to determine session-level video quality, stutter, and latency metrics (e.g., as cumulative sum or average metrics across all frames of the cloud gaming session). QoS policy evaluation manager 122 may also determine an overall optimality metric that combines multiple component optimality metrics. In some embodiments, for example, session-level optimality metrics of multiple components may be used to determine an overall optimality score (e.g., as a weighted average of the individual components). In other embodiments, overall per-frame optimality metrics may be determined (e.g., as a weighted average of per-frame optimality metric components), which may then be used to determine an overall optimality metric (e.g., as a cumulative sum, or average, metric across some or all frames of the cloud gaming session). In some embodiments, QoS policy evaluation manager 122 may combine optimality metrics for different components based on a relative priority (or weight) given to corresponding characteristics in the QoS policy used to provide the cloud gaming session.

In some embodiments, optimality metrics determined by QoS policy evaluation manager 122 may take the form of an additive reward metric, where each correct decision taken by a QoS policy (e.g., correctly adjusting a bitrate in response to changed network conditions) increases an overall optimality metric. In other embodiments, optimality metrics determined by QoS policy evaluation manager 122 may take the form of a penalty metric, where an overall optimality metric is reduced for each incorrect decision of a QoS policy. By way of example, QoS policy evaluation manager 122 may compute a per-frame penalty for one or more components reflecting the characteristics of the cloud gaming session that the QoS policy sought to affect (e.g., a per-frame video quality penalty, stutter penalty, and latency penalty, etc.), which QoS policy evaluation manager 122 may use to determine session-level penalty metrics (e.g., across some or all frames of a cloud gaming session) and an overall penalty metric (e.g., for the cloud gaming session as a whole).

In some embodiments, QoS policy evaluation manager 122 may determine an optimality metric (e.g., a per-frame penalty metric) for a characteristic of a cloud gaming session based on an analysis of performance data associated with the cloud gaming session. In some embodiments, for example, QoS policy evaluation manager 122 may determine an optimality metric for one or more performance indicators corresponding to respective characteristics of a cloud gaming session based on a determination that the one or more performance indicators are inconsistent with use of an optimized QoS policy. QoS policy evaluation manager 122, for instance, may determine a bitrate penalty, a frame drop penalty, and/or a transmission delay spike penalty (e.g., a OWD or RTD spike penalty) for video quality, stutters, and/or latency characteristics of a cloud gaming session, respectively.

In some embodiments, QoS policy evaluation manager 122 may determine an optimality metric based on an amount of inconsistency in a performance indicator with use of an optimized QoS policy (e.g., a magnitude of the inconsistency, a duration of the inconsistency, a frequency of the inconsistency, or a combination thereof). QoS policy evaluation manager 122, for instance, may determine a bitrate penalty metric based on a bitrate deficiency of a frame (e.g., a difference between an actual bitrate and an optimized bitrate for the frame). In some embodiments, QoS policy evaluation manager 122 may account for whether and/or how much of an inconsistency was due to external factors or conditions beyond the control of the QoS policy (e.g., a probability that the inconsistency was due to network congestion or other network conditions) in determining an optimality metric. By way of example, QoS policy evaluation manager 122 may determine a per-frame penalty metric for stutters based on a total number of frame drops experienced during a particular window of time adjusted by a probability that the inconsistency resulted from network congestion (e.g., estimated based on an aggregate change in estimated network queue depth over a period of time). Similarly, for latency, QoS policy evaluation manager 122 may determine a per-frame penalty metric based on an average of the transmission delay spikes experienced (e.g., a gradient of transmission delay relative to an average transmission delay) during a particular window of time adjusted by a probability that the inconsistency resulted from network congestion (e.g., estimated based on an aggregate change in estimated network queue depth over a period of time).

In some embodiments, QoS policy evaluation manager 122 may modify one or more control parameters of a QoS policy based on optimality metrics computed for a cloud gaming session conducted using the QoS policy.

In some embodiments, for example, QoS policy evaluation manager 122 may compare optimality metrics determined across multiple cloud gaming sessions provided using one or more different QoS policies. For instance, in some embodiments, QoS policy evaluation manager 122 may analyze a distribution of optimality metrics and identify those gaming sessions where action can be taken (e.g., where an optimality metric falls below a particular threshold or in a tail end of the distribution). In some cases, further investigation of those gaming sessions and/or QoS policies can reveal a cause of the inferior performance, which can then be addressed through QoS policy changes, e.g., by modifying one or more control parameters of the QoS policy. By way of example, an analysis of optimality metrics across gaming sessions may reveal that certain gaming participants may have their communication link throttled (e.g., limiting the available channel bandwidth). The QoS policy used for these gaming sessions can be adjusted in response, to account for the throttling (e.g., by adjusting bitrate and packet pacing control parameters of the QoS policy).

In some embodiments, QoS policy evaluation manager 122 may be able to identify differences in QoS policies (e.g., differences in how control parameters are adjusted) and correlate them against improved performance (e.g., relatively higher optimality metrics). QoS policy evaluation manager 122 may selectively adopt differences having a sufficiently high correlation (e.g., compared to a threshold criteria) with improved performance in QoS policies having lower performance. By way of example, the processing logic may determine that a bitrate control mechanism in a QoS policy results in an improved optimality metric when compared to other QoS policies and may modify the other QoS policies accordingly. In some embodiments, QoS policy evaluation manager 122 may be able to track QoS policies across time, as they may be changed, and may be able to identify those changes that result in improved optimality metrics. QoS policy evaluation manager 122 may selectively apply those changes resulting in significant improvements to optimality metrics associated with the QoS policy to other QoS policies that may be similarly improved.

Client device 150 may include one or more processors, such as processor 152, which may be coupled to and communicate with memory 154 (e.g., volatile or non-volatile memory) and communication interface 156, along with input device(s) 157 (e.g., keyboard, mouse, joystick, gaming controller, etc.) and output device(s) 158 (e.g., audio playback devices and video playback devices). Processor 152 may include a number of processing logic components 160 that can be used to perform different processes and/or operations. In some embodiments, for example, the processor 152 may include cloud gaming client agent 161.

In some embodiments, cloud gaming client agent 161 may be used by client device 150 to interact with cloud gaming service 111 provided by cloud server 110. In some embodiments, for example, cloud gaming client agent 161 may provide a client application 151 that can access cloud gaming service 111 over network 140 (e.g., the Internet). In some embodiments, the client application 151 may be a native application, a browser-based application, or the like, which may interface with cloud gaming service 111 to conduct a cloud gaming session. In some embodiments, cloud gaming service 111 may provide a cloud gaming session where a video game application is executed in the cloud (e.g., on cloud server 110) and a resulting output is streamed to client application 151 for presentation to a gaming participant (e.g., via output device(s) 158).

In some embodiments, for example, a gaming participant may be able to login to cloud gaming service 111 through client application 151 and access a library of one or more video games, which may be stored on cloud server 110. In some embodiments, a gaming participant may be able to access games provided through third-party game stores. A gaming participant may be able select a video game from the library through client application 151 and request cloud gaming service 111 to initiate a cloud gaming session for the particular video game on behalf of the gaming participant. Cloud gaming service 111 may create and initialize an instance of the video game on behalf of the gaming participant and gameplay may begin. A resulting gaming output of the video game instance may be streamed over network 140 to client application 151, which may receive and decode the incoming stream and present it to the gaming participant (e.g., via output device(s) 158). A gaming participant, in turn, may provide input or feedback through client application 151 (e.g., using input devices 157), which may be sent to cloud gaming service 111 for processing.

In some embodiments, cloud gaming client agent 161 may be used to implement a gaming session pipeline, for example, gaming session pipeline 170, which may be used to conduct a cloud gaming session (e.g., provided by cloud gaming service 111). Gaming session pipeline 170 may include a number of processing components that may be connected together to carry out a cloud gaming session. Each processing component may accept a number of inputs and generate a number of outputs, with the outputs of one component being provided to one or more other components to form the gaming session pipeline. The processing components may maintain one or more buffers to store the outputs generated by the components and may utilize buffers and queues to send the outputs to the next component (or components) in the processing pipeline.

Additional detail regarding the processing components and their operation is provided by way of example in the discussion herein. Gaming session pipeline 170 is not intended to represent a complete processing pipeline, and one or more additional and/or alternative components may be included in (and/or operations may be performed in) gaming session pipeline 170 or in addition to or alternatively from gaming session pipeline 170. Such additional and/or alternative components and/or operations may include, for example, a user login component for authenticating and authorizing a user to conduct a cloud gaming session or a user input component for receiving and processing user input (e.g., received via input device(s) 157). Such components and/or operations are not material to the understanding of the present disclosure and have been omitted for the sake of clarity and brevity. However, it should be understood that the gaming session pipeline 170 may include additional and/or alternative components and/or operations, which may be performed before, between, as part of, and/or after those enumerated herein.

In some embodiments, cloud gaming client agent 161 may implement gaming session pipeline 170, which at a high level may include session communication component 171 for receiving and de-packetizing incoming data packets to obtain encoded frames, frame decoding component 172 to decode encoded frames, and game presentation component 173 to present decoded frames to a user (e.g., via output device(s) 158). Gaming session pipeline 170 may also include performance data capture component 174 for capturing performance data regarding a cloud gaming session and providing it to cloud gaming service 111.

In some embodiments, session communication component 171 may be used to receive and process incoming data packets to obtain encoded frames that may be placed into one or more encoded frame buffers, which may be accessible by other processing components (e.g., frame decoding component 172). In some embodiments, for example, session communication component 135 may receive incoming data packets from cloud server 110 as part of a cloud gaming session and place them in a receive buffer (e.g., in memory 154) for processing. The incoming data packets may be formatted in accordance with one or more communication protocols with each data packet containing application data, e.g., encoded frame data or error correction data, within its payload. Session communication component 171 may process received data packets to extract their payload, e.g., to obtain encoded frames and/or error correction data blocks contained therein. In some cases, data for an encoded frame or an error correction data block may be divided across multiple data packets. In such cases, session communication component 171 may operate to reassemble encoded frames and/or error correction data blocks spread across multiple data packets. In some embodiments, network 140 may not provide for reliable data communication, such that data communicated over network 140 (e.g., between cloud server 110 and client device 150) may be corrupted during transmission and/or fail to arrive altogether. In such embodiments, session communication component 171 may use error correction data blocks to detect and correct transmission errors in corresponding encoded frame data. Once de-packetized and error corrected (as necessary), session communication component 171 may place encoded frames into one or more encoded frame buffers, which may be accessible by other processing components (e.g., frame decoding component 172).

In some embodiments, frame decoding component 172 may be used to process encoded frames (e.g., obtained from incoming data packets by session communication component 171) to generate decoded frames, which may be stored in one or more decoded frame buffers (e.g., in memory 114). In some embodiments, for example, encoded frames may be encoded in a particular format (e.g., defined by an encoding standard), which frame decoding component 172 may be capable of decoding to obtain decoded frames capable of presentation to a gaming participant. In some embodiments, there may be different types of encoded frames (e.g., encoded audio and encoded video frames), which frame decoding component 172 may process separately (e.g., using different decoders and placing respective decoded frames in separate decoded frame buffers). In some embodiments, frame decoding component 172 may detect when an encoded frame is being or has been received, for example, by monitoring one or more encoded frame buffers where the encoded frames may be written (e.g., by session communication component 171). In other embodiments, frame decoding component 172 may receive a signal (e.g., from session communication component 171) indicating that an encoded frame is being or has been received. Upon detection or notification that an encoded frame is being or has been received, frame decoding component 172 may decode the encoded frame to generate a decoded frame, which may be stored in one or more decoded frame buffers (e.g., in memory 114) for further processing (e.g., by game presentation component 173). In some embodiments, frame decoding component 172 may employ features or capabilities provided by processors of the client device 150 (e.g., processor 152) in decoding encoded frames. Frame decoding component 172, for example, may make use of CPUs or GPUs that include hardware decoder units (e.g., H.264 or H.265 decoder units).

In some embodiments, game presentation component 173 may be used to present decoded frames (e.g., generated by frame decoding component 172) to a gaming participant, for example, using output device(s) 158 of client device 150. Game presentation component 173, for example, may render and display decoded video frames on a video display device (e.g., on a monitor, television, etc.) and playback decoded audio frames on an audio playback device (e.g., speakers, headphones, etc.).

In some embodiments, performance data capture component 174 may be used to capture performance data regarding a cloud gaming session, which may be stored in memory 154 and/or sent to cloud gaming service 111 (e.g., over network 140 using communication interface 156) during and/or following completion of a cloud gaming session. In some embodiments, for example, performance data capture component 174 may capture data regarding processing performed by client device 151 and its various processing components (e.g., by cloud gaming client device agent 161 including session communication component 171, frame decoding component 172 and game presentation component 173, etc.). In some embodiments, for example, performance data capture component 174 may capture data regarding the receipt and/or other processing of data, including for example, identifiers associated with received data or portions thereof (e.g., encoded frame identifier, error correction data block identifier, packet identifier, etc.), timing information associated with the receipt or other processing of data (e.g., a timestamp for the start and/or end of processing), and/or settings and parameters associated with receiving or otherwise processing data or portions thereof. In some embodiments, performance data capture component 174 may capture data regarding a state of client device 150 and its components during a cloud gaming session. In some embodiments, for example, performance data capture component 174 may capture data regarding a utilization rate of processor 152, memory 154, and/or network interface 156. Performance data capture component 174, for instance, may capture utilization data at regular intervals and/or contemporaneous with processing performed by the various processing components (e.g., contemporaneous with decoding or presenting video game frames). In some embodiments, performance data capture component 174 may capture data regarding errors or other significant processing events (e.g., frame drops, etc.), including for example, the type of error or processing event and details regarding the error or processing event. Performance data capture component 174, for instance, may capture performance data regarding frame drops experienced during the cloud gaming session, including for example, a frame identifier of the dropped frame, when the frame drop was experienced, and a reason for the frame drop (e.g., encoded frame data was not received, and could not be recovered, in time, encoded frame data could not be decoded and displayed in time, etc.).

Figure 2:
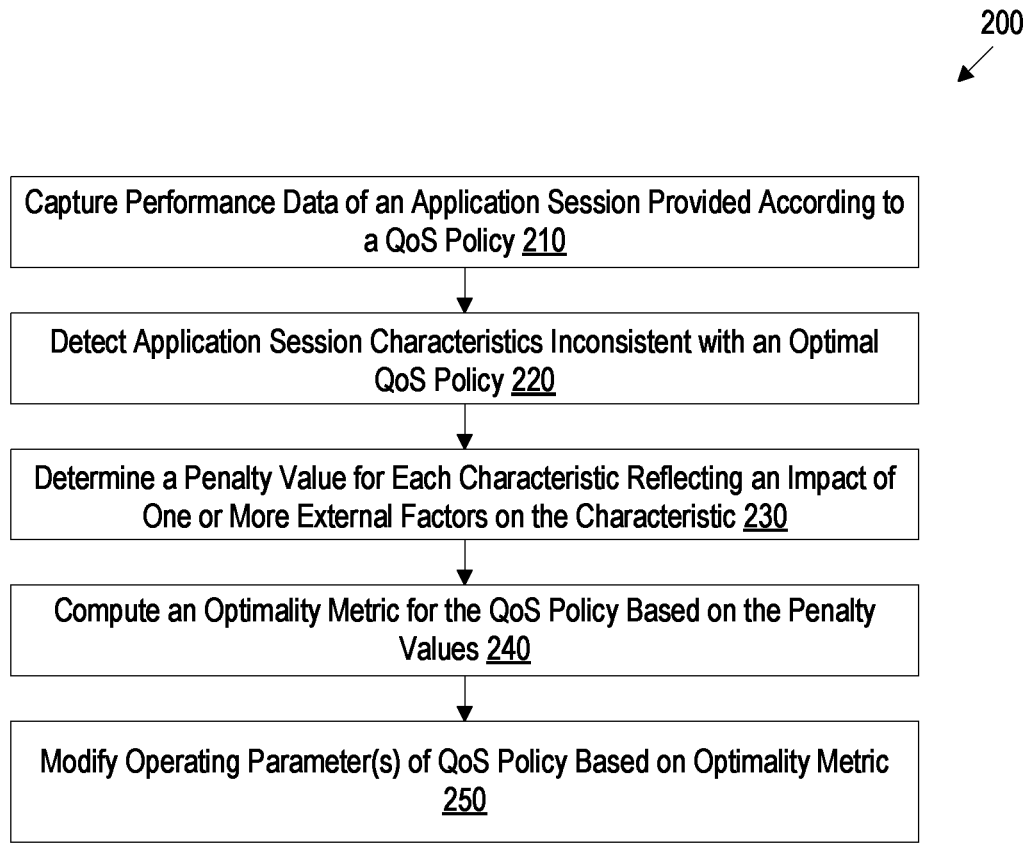
FIG. 2 illustrates a flow diagram of an example method for evaluating an optimality used to provide an application session, according to at least one embodiment.

FIG. 2 illustrates a flow diagram of an example method 200 for evaluating an optimality of a QoS policy used to provide an application session, according to at least one embodiment. For the sake of simplicity and clarity, the method is depicted and described as a series of operations. However, in accordance with the present disclosure, such operations may be performed in other orders and/or concurrently, and with other operations not presented or described herein. Furthermore, not all illustrated operations may be required in implementing methods in accordance with the present disclosure. Those of skill in the art will also understand and appreciate that the methods could be represented as a series of interrelated states or events via a state diagram. Additionally, it will be appreciated that the disclosed methods are capable of being stored on an article of manufacture. The term "article of manufacture," as used herein, is intended to encompass a computer-readable device or storage media provided with a computer program and/or executable instructions that, when executed, affect one or more operations. The method 200 may be performed by processing logic of a computing device (e.g., using processor 112 of cloud server 110 shown in FIG. 1).

At operation 210, processing logic may capture performance data for an application session (e.g., cloud gaming session) associated with a client device that was provided according to a QoS policy. In some embodiments, for example, processing logic may capture performance data for an application session (e.g., cloud gaming session) carried out between an application service (e.g., cloud gaming service 111 hosted on cloud server 110) and a client application (e.g., client application 151 running on client device 150). In some embodiments, each frame of the application session may be associated with one or more performance data elements. In some embodiments, for example, each frame of an application session (e.g., cloud gaming session) may be associated with data regarding the generation of the encoded frame (e.g., timing information, encoding settings or parameters, performance state information, processing errors, etc.). In some embodiments, each frame of an application session (e.g., cloud gaming session) may be associated with data regarding upstream and/or downstream processing of the encoded frame (e.g., by cloud server 110, network 140, and/or client device 150). In some embodiments, for example, each frame of an application session (e.g., cloud gaming session) may be associated with data (e.g., data identifiers, timing information, processing settings or parameters, performance state information, processing errors, etc.) regarding the rendering and capture of frames (e.g., video game frames) used to generate the encoded frame, the generation of error correction data for an encoded frame, the processing and transmission of the encoded frame and associated error correction data as one or more data packets to a client device, the receipt and processing of data packets by the client device to obtain the encoded frame, and the decoding and presentation of the encoded frame by the client device. In some embodiments, each frame of an application session (e.g., cloud gaming session) may be associated with derived performance data, including for example, associated processing delays, transmission delays, channel bandwidth estimates, and/or filtered performance data (e.g., filtered transmission delay data, frame drop data, channel bandwidth data, bitrate data, etc.).

At operation 220, the processing logic may detect that one or more characteristics of the application session (e.g., cloud gaming session) are inconsistent with use of an (e.g., optimized) QoS policy. In some embodiments, for example, the processing logic may evaluate the optimality of a QoS policy with respect to the video quality, number of stutters (or stutters), and/or latency experienced during an application session (e.g., cloud gaming session).

In some embodiments, the processing logic may do so by analyzing performance data for the application session (e.g., gaming session) to determine whether one or more performance indicators associated with each characteristic are inconsistent with use of an optimized QoS policy. In some embodiments, for example, the processing logic may analyze bitrate, frame drop, and/or transmission delay indicators to assess the video quality, stutters, and latency characteristics of an application session (e.g., cloud gaming session), respectively. In some cases, the processing logic may determine whether a performance indicator is inconsistent with use of an optimized QoS policy by comparing a performance indicator to an optimized performance indicator, e.g., that would have been expected under an optimized QoS policy. The processing logic, for example, may compare an actual bitrate (e.g., based on an actual number of bits used for an encoded frame) to an optimized bitrate that would have been expected under an optimized QoS policy. In some embodiments, the processing logic may use performance data for the application session (e.g., cloud gaming session) to determine the optimized performance indicator (e.g., an optimized bitrate).

At operation 230, the processing logic may determine a penalty value for each characteristic of the application session (e.g., cloud gaming session). The processing logic may determine a penalty value at or across one or more instances or points in time and/or for the application session as a whole. For example, the processing logic may determine a penalty value for each frame of an application session (e.g., a per-frame penalty value) along with a penalty value across some or all frames of the application session (e.g., a session-level penalty value). The processing logic, for instance, may determine per-frame video quality, stutter, and/or latency penalty values, which the processing logic may use to determine session-level video quality, stutter, and/or latency penalty values (e.g., as a cumulative sum, or average, penalty value across some or all frames of the application session).

In some embodiments, the processing logic may determine a penalty value based on an amount of inconsistency in the one or more associated performance indicators with use of an optimized QoS policy. The processing logic, for example, may determine an amount of inconsistency based on a magnitude of the inconsistency, a duration of the inconsistency, a frequency of the inconsistency, or a combination thereof. The processing logic, for instance, may determine a per-frame video quality penalty based on a bitrate deficiency of a frame (e.g., a difference between an actual bitrate and an optimized bitrate for the frame).

In some embodiments, the processing logic may account for whether and/or how much of an inconsistency was due to external factors or conditions beyond the control of the QoS policy in determining a penalty value. By way of example, the processing logic may determine a per-frame penalty for stutters based on a total number of frame drops experienced during a particular window of time adjusted by a probability that the inconsistency resulted from network congestion (e.g., estimated based on an aggregate change in estimated network queue depth over a period of time). Similarly, for latency, the processing logic may determine a per-frame penalty metric based on an average of the transmission delay spikes experienced (e.g., a gradient of transmission delay relative to an average transmission delay) during a particular window of time adjusted by a probability that the inconsistency resulted from network congestion (e.g., estimated based on an aggregate change in estimated network queue depth over a period of time). In this way, the penalty value determined for each characteristic may reflect an impact that one or more external factors had on the characteristic.

At operation 240, the processing logic may compute an optimality metric for the QoS policy based on the penalty values determined for the one or more characteristics of the application session (e.g., cloud gaming session). In some embodiments, for example, the processing logic may determine an optimality metric for each frame of an application session (e.g., a per-frame optimality metric), an optimality metric for each of the one or more characteristics across some or all frames of the application session (e.g., a per-characteristic session-level optimality metric), and/or an optimality metric for the application session as a whole (e.g., an overall optimality metric). In some embodiments, the processing logic may compute the optimality metric as a sum or average of the penalty values for each characteristic of the application session (e.g., cloud gaming session). The processing logic, for example, may compute a sum or average across some or all characteristics for each frame of the application session (e.g., to obtain a per-frame optimality metric), for each characteristic across some or all frames of the application session (e.g., to obtain a per-characteristic session-level optimality metric), and/or across some or all characteristics for some or all frames of the application session (e.g., to obtain an overall optimality metric). In some embodiments, the processing logic may compute the optimality metric as a weighted sum or average of the penalty values for each characteristic of the application session (e.g., cloud gaming session). In some embodiments, for example, the processing logic may determine the weighting (e.g., to be used in computing the weighted sum or average) based on a relative priority of the one or more characteristics (e.g., in the QoS policy used to provide the cloud gaming session). In some cases, the relative priority of the one or more characteristics may be determined based on a user experience preset that may define a relative priority of the one or more characteristics of the application session (e.g., cloud gaming session).

At operation 250, the processing logic may modify one or more control parameters of the QoS policy based on the optimality metric. In some embodiments, for example, the processing logic may compare optimality metrics determined across multiple application sessions (e.g., across multiple cloud gaming sessions) provided using one or more different QoS policies. For instance, in some embodiments, the processing logic may analyze a distribution of optimality metrics (e.g., per-frame optimality metrics, per-characteristic session-level optimality metrics, and/or overall optimality metrics) and identify those application sessions (e.g., cloud gaming sessions), and/or specific frames (or frame ranges) and/or specific characteristics therein, where action can be taken (e.g., where an optimality metric falls below a particular threshold or in a tail end of the distribution). In some cases, further investigation of those application sessions and/or QoS policies can reveal a cause of the inferior performance, which can then be addressed through QoS policy changes, e.g., by modifying one or more control parameters of the QoS policy.

In some embodiments, the processing logic may be able to identify differences in QoS policies (e.g., differences in how control parameters are adjusted) and correlate them against improved performance (e.g., relatively higher optimality metrics). The processing logic may selectively adopt differences having a sufficiently high correlation (e.g., compared to a threshold criteria) with improved performance in QoS policies having lower performance. By way of example, the processing logic may determine that a bitrate control mechanism in a QoS policy results in an improved optimality metric when compared to other QoS policies and may modify the other QoS policies accordingly.

Figure 3:
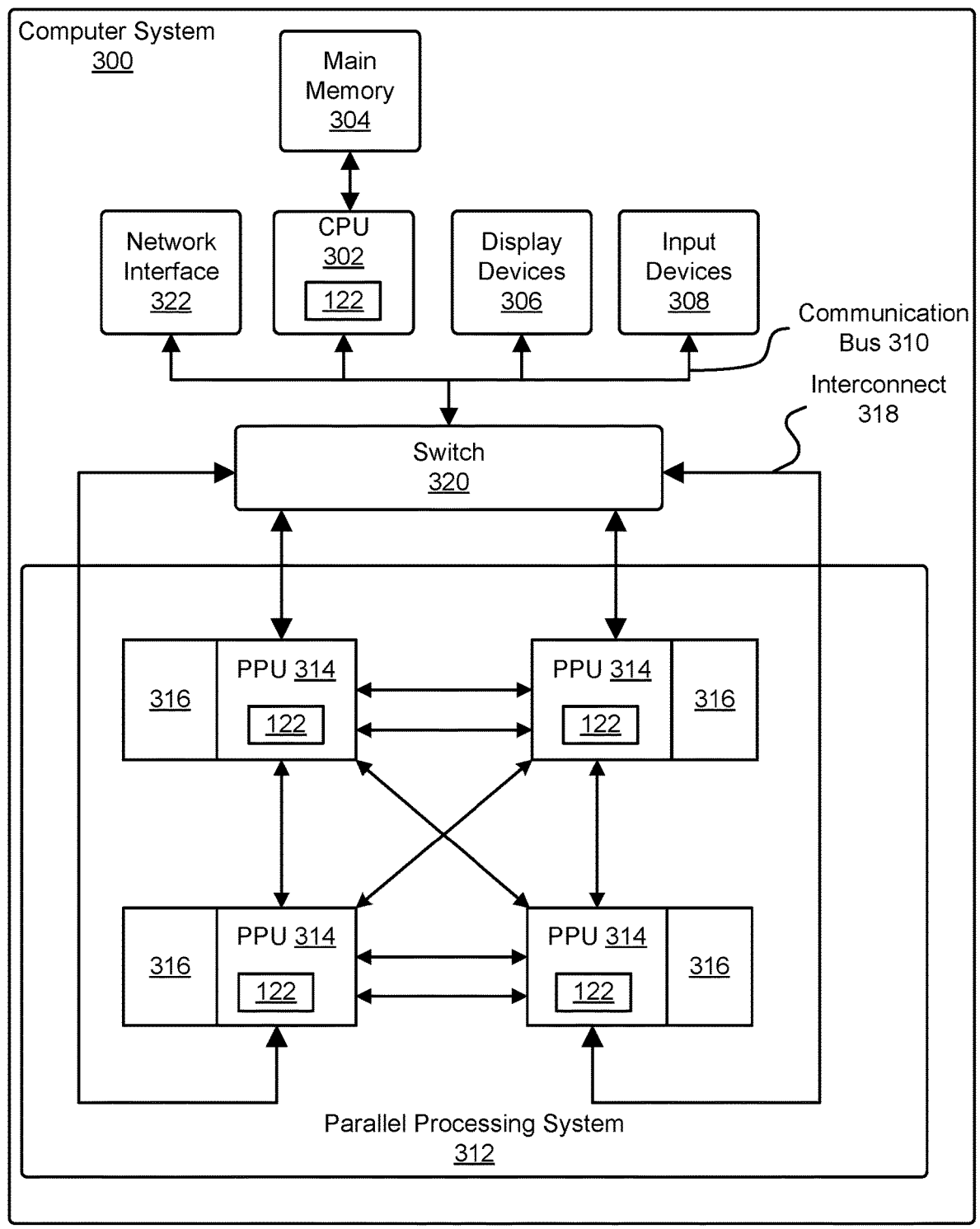
FIG. 3 illustrates a computer system, according to at least one embodiment.

FIG. 3 illustrates a computer system 300, according to at least one embodiment. In at least one embodiment, computer system 300 is configured to implement various processes and methods described throughout this disclosure.

In at least one embodiment, computer system 300 comprises at least one central processing unit ("CPU") 302 that is connected to a communication bus 310 implemented using any suitable protocol, such as PCI ("Peripheral Component Interconnect"), peripheral component interconnect express ("PCI-Express"), AGP ("Accelerated Graphics Port"), HyperTransport, or any other bus or point-to-point communication protocol(s). In at least one embodiment, computer system 300 includes a main memory 304, which may take the form of random access memory ("RAM"). Control logic (e.g., implemented as hardware, software, or a combination thereof) and data are stored in main memory 304. In at least one embodiment, a network interface subsystem ("network interface") 322 provides an interface to other computing devices and networks for receiving data from and transmitting data to other systems with computer system 300.

In at least one embodiment, computer system 300 includes one or more input devices 308, a parallel processing system 312, and one or more display devices 306 that can be implemented using a conventional cathode ray tube ("CRT"), a liquid crystal display ("LCD"), a light emitting diode ("LED") display, a plasma display, or other suitable display technologies. In at least one embodiment, user input is received from input devices 308 such as keyboard, mouse, touchpad, microphone, etc. In at least one embodiment, each module described herein can be situated on a single semiconductor platform to form a processing system.

QoS policy evaluation manager 122 may be used to evaluate the optimality of a QoS policy used to provide an application session (e.g., a cloud gaming session) and make improvements thereto. Details regarding QoS policy evaluation manager 122 are provided herein in conjunction with FIG. 1. In at least one embodiment, QoS policy evaluation manager 122 may be used in the system of FIG. 3 for evaluating the optimality of a QoS policy used to provide an application session (e.g., a cloud gaming session) and make improvements thereto.

In at least one embodiment, computer programs in form of machine-readable executable code or computer control logic algorithms are stored in main memory 304 and/or secondary storage. Computer programs, if executed by one or more processors, enable system 300 to perform various functions in accordance with at least one embodiment. In at least one embodiment, memory 304, storage, and/or any other storage are possible examples of computer-readable media. In at least one embodiment, secondary storage may refer to any suitable storage device or system such as a hard disk drive and/or a removable storage drive, representing a floppy disk drive, a magnetic tape drive, a compact disk drive, digital versatile disk ("DVD") drive, recording device, universal serial bus ("USB") flash memory, etc.

In at least one embodiment, architecture and/or functionality of various previous figures are implemented in the context of CPU 302, parallel processing system 312, an integrated circuit capable of at least a portion of capabilities of both CPU 302 and parallel processing system 312, a chipset (e.g., a group of integrated circuits designed to work and sold as a unit for performing related functions, etc.), and/or any suitable combination of integrated circuit(s). In at least one embodiment, architecture and/or functionality of various previous figures are implemented in the context of a general computer system, a circuit board system, a game console system dedicated for entertainment purposes, an application-specific system, and more. In at least one embodiment, computer system 300 may take the form of a desktop computer, a laptop computer, a tablet computer, a server, a supercomputer, a smart-phone (e.g., a wireless, hand-held device), a personal digital assistant ("PDA"), a digital camera, a vehicle, a head mounted display, a hand-held electronic device, a mobile phone device, a television, a workstation, a game console, an embedded system, and/or any other type of logic device.

In at least one embodiment, parallel processing system 312 includes a plurality of parallel processing units ("PPUs") 314 and associated memories 316. In at least one embodiment, PPUs 314 are connected to a host processor or other peripheral devices via an interconnect 318 and a switch 320 or multiplexer. In at least one embodiment, parallel processing system 312 distributes computational tasks across PPUs 314 which can be parallelizable—for example, as part of distribution of computational tasks across multiple graphics processing unit ("GPU") thread blocks. In at least one embodiment, memory is shared and accessible (e.g., for read and/or write access) across some or all of PPUs 314, although such shared memory may incur performance penalties relative to use of local memory and registers resident to a PPU 314. In at least one embodiment, operation of PPUs 314 is synchronized through use of a command such as _syncthreads( ) wherein all threads in a block (e.g., executed across multiple PPUs 314) to reach a certain point of execution of code before proceeding.

Figure 4:
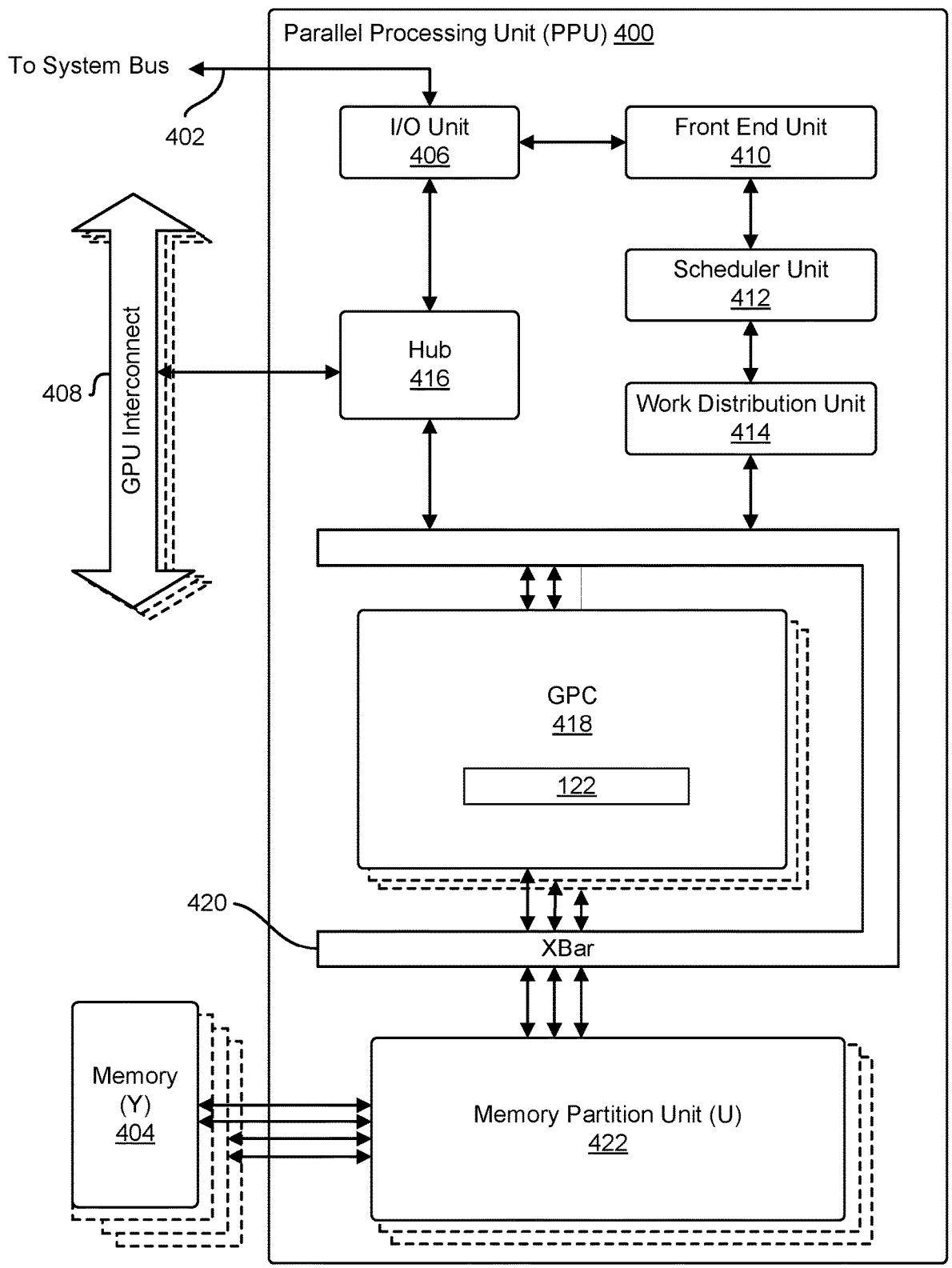
FIG. 4 illustrates a parallel processing unit ("PPU"), according to at least one embodiment.

FIG. 4 illustrates a parallel processing unit ("PPU") 400, according to at least one embodiment. In at least one embodiment, PPU 400 is configured with machine-readable code that, if executed by PPU 400, causes PPU 400 to perform some or all of processes and techniques described throughout this disclosure. In at least one embodiment, PPU 400 is a multi-threaded processor that is implemented on one or more integrated circuit devices and that utilizes multi-threading as a latency-hiding technique designed to process computer-readable instructions (also referred to as machine-readable instructions or simply instructions) on multiple threads in parallel. In at least one embodiment, a thread refers to a thread of execution and is an instantiation of a set of instructions configured to be executed by PPU 400. In at least one embodiment, PPU 400 is a graphics processing unit ("GPU") configured to implement a graphics rendering pipeline for processing three-dimensional ("3D") graphics data in order to generate two-dimensional ("2D") image data for display on a display device such as a liquid crystal display ("LCD") device. In at least one embodiment, PPU 400 is utilized to perform computations such as linear algebra operations and machine-learning operations. FIG. 4 illustrates an example parallel processor for illustrative purposes only and should be construed as a non-limiting example of processor architectures contemplated within scope of this disclosure and that any suitable processor may be employed to supplement and/or substitute for same.

In at least one embodiment, one or more PPUs 400 are configured to accelerate High Performance Computing ("HPC"), data center, and machine learning applications. In at least one embodiment, PPU 400 is configured to accelerate deep learning systems and applications including following non-limiting examples: autonomous vehicle platforms, deep learning, high-accuracy speech, image, text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and more.

In at least one embodiment, PPU 400 includes an Input/Output ("I/O") unit 406, a front-end unit 410, a scheduler unit 412, a work distribution unit 414, a hub 416, a crossbar ("XBar") 420, one or more general processing clusters ("GPCs") 418, and one or more partition units ("memory partition units") 422. In at least one embodiment, PPU 400 is connected to a host processor or other PPUs 400 via one or more high-speed GPU interconnects ("GPU interconnects") 408. In at least one embodiment, PPU 400 is connected to a host processor or other peripheral devices via a system bus 402. In at least one embodiment, PPU 400 is connected to a local memory comprising one or more memory devices ("memory") 404. In at least one embodiment, memory devices 404 include one or more dynamic random access memory ("DRAM") devices. In at least one embodiment, one or more DRAM devices are configured and/or configurable as high-bandwidth memory ("HBM") subsystems, with multiple DRAM dies stacked within each device.

In at least one embodiment, high-speed GPU interconnect 408 may refer to a wire-based multi-lane communications link that is used by systems to scale and include one or more PPUs 400 combined with one or more central processing units ("CPUs"), supports cache coherence between PPUs 400 and CPUs, and CPU mastering. In at least one embodiment, data and/or commands are transmitted by high-speed GPU interconnect 408 through hub 416 to/from other units of PPU 400 such as one or more copy engines, video encoders, video decoders, power management units, and other components which may not be explicitly illustrated in FIG. 4.

In at least one embodiment, I/O unit 406 is configured to transmit and receive communications (e.g., commands, data) from a host processor (not illustrated in FIG. 4) over system bus 402. In at least one embodiment, I/O unit 406 communicates with host processor directly via system bus 402 or through one or more intermediate devices such as a memory bridge. In at least one embodiment, I/O unit 406 may communicate with one or more other processors, such as one or more of PPUs 400 via system bus 402. In at least one embodiment, I/O unit 406 implements a Peripheral Component Interconnect Express ("PCIe") interface for communications over a PCIe bus. In at least one embodiment, I/O unit 406 implements interfaces for communicating with external devices.

In at least one embodiment, I/O unit 406 decodes packets received via system bus 402. In at least one embodiment, at least some packets represent commands configured to cause PPU 400 to perform various operations. In at least one embodiment, I/O unit 406 transmits decoded commands to various other units of PPU 400 as specified by commands. In at least one embodiment, commands are transmitted to front-end unit 410 and/or transmitted to hub 416 or other units of PPU 400 such as one or more copy engines, a video encoder, a video decoder, a power management unit, etc. (not explicitly illustrated in FIG. 4). In at least one embodiment, I/O unit 406 is configured to route communications between and among various logical units of PPU 400.

In at least one embodiment, a program executed by host processor encodes a command stream in a buffer that provides workloads to PPU 400 for processing. In at least one embodiment, a workload comprises instructions and data to be processed by those instructions. In at least one embodiment, a buffer is a region in a memory that is accessible (e.g., read/write) by both a host processor and PPU 400— a host interface unit may be configured to access that buffer in a system memory connected to system bus 402 via memory requests transmitted over system bus 402 by I/O unit 406. In at least one embodiment, a host processor writes a command stream to a buffer and then transmits a pointer to a start of a command stream to PPU 400 such that front-end unit 410 receives pointers to one or more command streams and manages one or more command streams, reading commands from command streams and forwarding commands to various units of PPU 400.

In at least one embodiment, front-end unit 410 is coupled to scheduler unit 412 that configures various GPCs 418 to process tasks defined by one or more command streams. In at least one embodiment, scheduler unit 412 is configured to track state information related to various tasks managed by scheduler unit 412 where state information may indicate which of GPCs 418 a task is assigned to, whether task is active or inactive, a priority level associated with task, and so forth. In at least one embodiment, scheduler unit 412 manages execution of a plurality of tasks on one or more of GPCs 418.

In at least one embodiment, scheduler unit 412 is coupled to work distribution unit 414 that is configured to dispatch tasks for execution on GPCs 418. In at least one embodiment, work distribution unit 414 tracks a number of scheduled tasks received from scheduler unit 412 and work distribution unit 414 manages a pending task pool and an active task pool for each of GPCs 418. In at least one embodiment, pending task pool comprises a number of slots (e.g., 32 slots) that contain tasks assigned to be processed by a particular GPC 418; an active task pool may comprise a number of slots (e.g., 4 slots) for tasks that are actively being processed by GPCs 418 such that as one of GPCs 418 completes execution of a task, that task is evicted from that active task pool for GPC 418 and another task from a pending task pool is selected and scheduled for execution on GPC 418. In at least one embodiment, if an active task is idle on GPC 418, such as while waiting for a data dependency to be resolved, then that active task is evicted from GPC 418 and returned to that pending task pool while another task in that pending task pool is selected and scheduled for execution on GPC 418.

In at least one embodiment, work distribution unit 414 communicates with one or more GPCs 418 via XBar 420. In at least one embodiment, XBar 420 is an interconnect network that couples many of units of PPU 400 to other units of PPU 400 and can be configured to couple work distribution unit 414 to a particular GPC 418. In at least one embodiment, one or more other units of PPU 400 may also be connected to XBar 420 via hub 416.

In at least one embodiment, tasks are managed by scheduler unit 412 and dispatched to one of GPCs 418 by work distribution unit 414. In at least one embodiment, GPC 418 is configured to process task and generate results. In at least one embodiment, results may be consumed by other tasks within GPC 418, routed to a different GPC 418 via XBar 420, or stored in memory 404. In at least one embodiment, results can be written to memory 404 via partition units 422, which implement a memory interface for reading and writing data to/from memory 404. In at least one embodiment, results can be transmitted to another PPU 404 or CPU via high-speed GPU interconnect 408. In at least one embodiment, PPU 400 includes a number U of partition units 422 that is equal to a number of separate and distinct memory devices 404 coupled to PPU 400, as described in more detail herein in conjunction with FIG. 6.

In at least one embodiment, a host processor executes a driver kernel that implements an application programming interface ("API") that enables one or more applications executing on a host processor to schedule operations for execution on PPU 400. In at least one embodiment, multiple compute applications are simultaneously executed by PPU 400 and PPU 400 provides isolation, quality of service ("QoS"), and independent address spaces for multiple compute applications. In at least one embodiment, an application generates instructions (e.g., in form of API calls) that cause a driver kernel to generate one or more tasks for execution by PPU 400 and that driver kernel outputs tasks to one or more streams being processed by PPU 400. In at least one embodiment, each task comprises one or more groups of related threads, which may be referred to as a warp. In at least one embodiment, a warp comprises a plurality of related threads (e.g., 32 threads) that can be executed in parallel. In at least one embodiment, cooperating threads can refer to a plurality of threads including instructions to perform task and that exchange data through shared memory. In at least one embodiment, threads and cooperating threads are described in more detail in conjunction with FIG. 7.

QoS policy evaluation manager 122 may be used to evaluate the optimality of a QoS policy used to provide an application session (e.g., a cloud gaming session) and make improvements thereto. Details regarding QoS policy evaluation manager 122 are provided herein in conjunction with FIG. 1. In at least one embodiment, QoS policy evaluation manager 122 may be used in the PPU 400 of FIG. 4 for evaluating the optimality of a QoS policy used to provide an application session (e.g., a cloud gaming session) and make improvements thereto.

Figure 5:
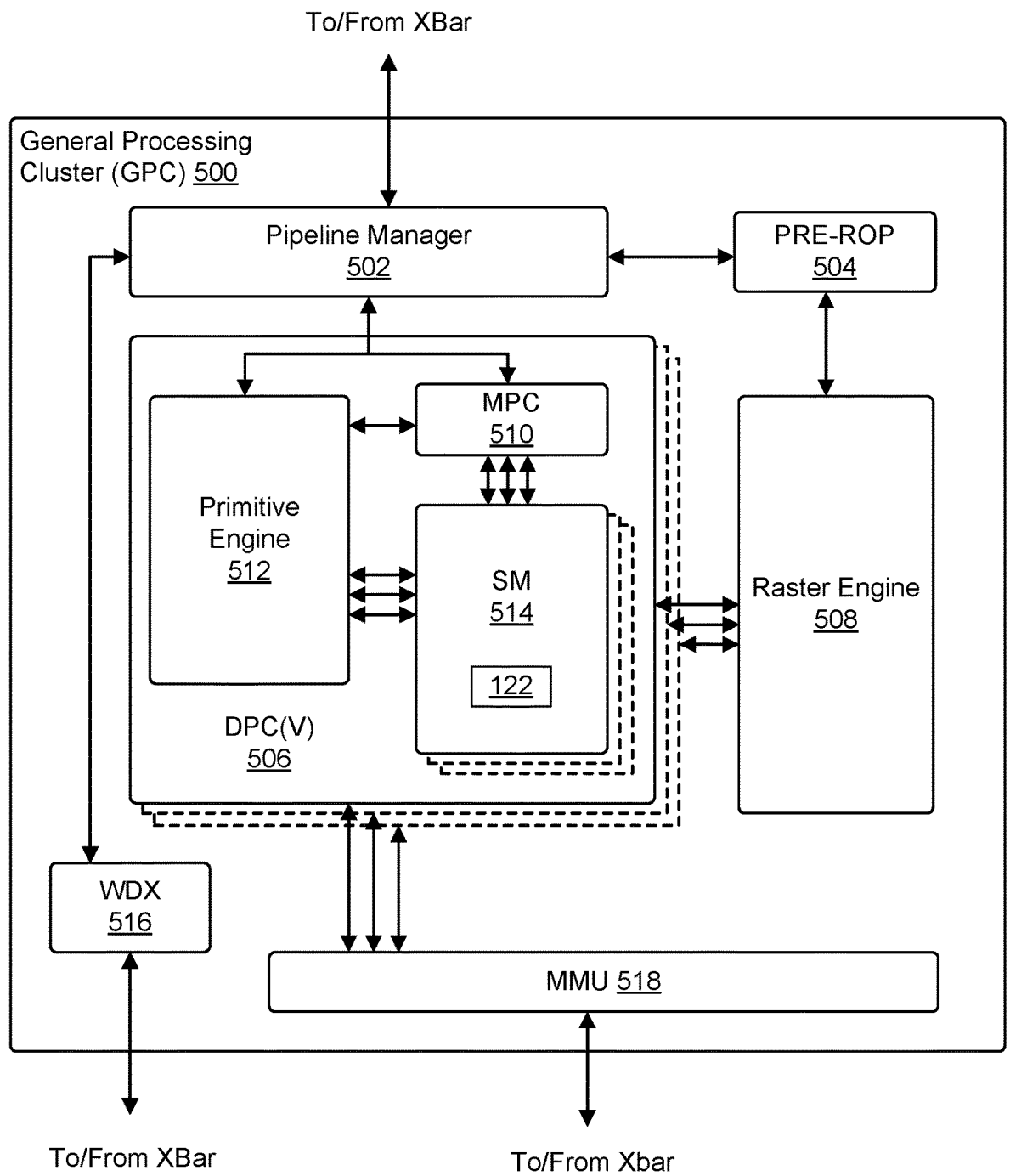
FIG. 5 illustrates a general processing cluster ("GPC"), according to at least one embodiment.

FIG. 5 illustrates a general processing cluster ("GPC") 500, according to at least one embodiment. In at least one embodiment, GPC 500 is GPC 418 of FIG. 4. In at least one embodiment, each GPC 500 includes a number of hardware units for processing tasks and each GPC 500 includes a pipeline manager 502, a pre-raster operations unit ("preROP") 504, a raster engine 508, a work distribution crossbar ("WDX") 516, a memory management unit ("MMU") 518, one or more Data Processing Clusters ("DPCs") 506, and any suitable combination of parts.

In at least one embodiment, operation of GPC 500 is controlled by pipeline manager 502. In at least one embodiment, pipeline manager 502 manages configuration of one or more DPCs 506 for processing tasks allocated to GPC 500. In at least one embodiment, pipeline manager 502 configures at least one of one or more DPCs 506 to implement at least a portion of a graphics rendering pipeline. In at least one embodiment, DPC 506 is configured to execute a vertex shader program on a programmable streaming multi-processor ("SM") 514. In at least one embodiment, pipeline manager 502 is configured to route packets received from a work distribution unit to appropriate logical units within GPC 500, in at least one embodiment, and some packets may be routed to fixed function hardware units in preROP 504 and/or raster engine 508 while other packets may be routed to DPCs 506 for processing by a primitive engine 512 or SM 514. In at least one embodiment, pipeline manager 502 configures at least one of DPCs 506 to implement a neural network model and/or a computing pipeline.

In at least one embodiment, preROP unit 504 is configured, in at least one embodiment, to route data generated by raster engine 508 and DPCs 506 to a Raster Operations ("ROP") unit in partition unit 422, described in more detail above in conjunction with FIG. 4. In at least one embodiment, preROP unit 504 is configured to perform optimizations for color blending, organize pixel data, perform address translations, and more. In at least one embodiment, raster engine 508 includes a number of fixed function hardware units configured to perform various raster operations, in at least one embodiment, and raster engine 508 includes a setup engine, a coarse raster engine, a culling engine, a clipping engine, a fine raster engine, a tile coalescing engine, and any suitable combination thereof. In at least one embodiment, setup engine receives transformed vertices and generates plane equations associated with geometric primitive defined by vertices; plane equations are transmitted to a coarse raster engine to generate coverage information (e.g., an x, y coverage mask for a tile) for primitive; output of a coarse raster engine is transmitted to a culling engine where fragments associated with a primitive that fail a z-test are culled, and transmitted to a clipping engine where fragments lying outside a viewing frustum are clipped. In at least one embodiment, fragments that survive clipping and culling are passed to a fine raster engine to generate attributes for pixel fragments based on plane equations generated by a setup engine. In at least one embodiment, an output of raster engine 508 comprises fragments to be processed by any suitable entity, such as by a fragment shader implemented within DPC 506.

In at least one embodiment, each DPC 506 included in GPC 500 comprises an M-Pipe Controller ("MPC") 510; primitive engine 512; one or more SMs 514; and any suitable combination thereof. In at least one embodiment, MPC 510 controls operation of DPC 506, routing packets received from pipeline manager 502 to appropriate units in DPC 506. In at least one embodiment, packets associated with a vertex are routed to primitive engine 512, which is configured to fetch vertex attributes associated with a vertex from memory; in contrast, packets associated with a shader program may be transmitted to SM 514.

In at least one embodiment, SM 514 comprises a programmable streaming processor that is configured to process tasks represented by a number of threads. In at least one embodiment, SM 514 is multi-threaded and configured to execute a plurality of threads (e.g., 32 threads) from a particular group of threads concurrently and implements a Single-Instruction, Multiple-Data ("SIMD") architecture where each thread in a group of threads (e.g., a warp) is configured to process a different set of data based on same set of instructions. In at least one embodiment, all threads in group of threads execute a common set of instructions. In at least one embodiment, SM 514 implements a Single-Instruction, Multiple Thread ("SIMT") architecture wherein each thread in a group of threads is configured to process a different set of data based on that common set of instructions, but where individual threads in a group of threads are allowed to diverge during execution. In at least one embodiment, a program counter, call stack, and execution state is maintained for each warp, enabling concurrency between warps and serial execution within warps when threads within a warp diverge. In another embodiment, a program counter, call stack, and execution state is maintained for each individual thread, enabling equal concurrency between all threads, within and between warps. In at least one embodiment, execution state is maintained for each individual thread and threads executing common instructions may be converged and executed in parallel for better efficiency. At least one embodiment of SM 514 is described in more detail herein.

In at least one embodiment, MMU 518 provides an interface between GPC 500 and a memory partition unit (e.g., partition unit 422 of FIG. 4) and MMU 518 provides translation of virtual addresses into physical addresses, memory protection, and arbitration of memory requests. In at least one embodiment, MMU 518 provides one or more translation lookaside buffers ("TLBs") for performing translation of virtual addresses into physical addresses in memory.

QoS policy evaluation manager 122 may be used to evaluate the optimality of a QoS policy used to provide an application session (e.g., a cloud gaming session) and make improvements thereto. Details regarding QoS policy evaluation manager 122 are provided herein in conjunction with FIG. 1. In at least one embodiment, QoS policy evaluation manager 122 may be used in the GPC 500 of FIG. 5 for evaluating the optimality of a QoS policy used to provide an application session (e.g., a cloud gaming session) and make improvements thereto.

Figure 6:
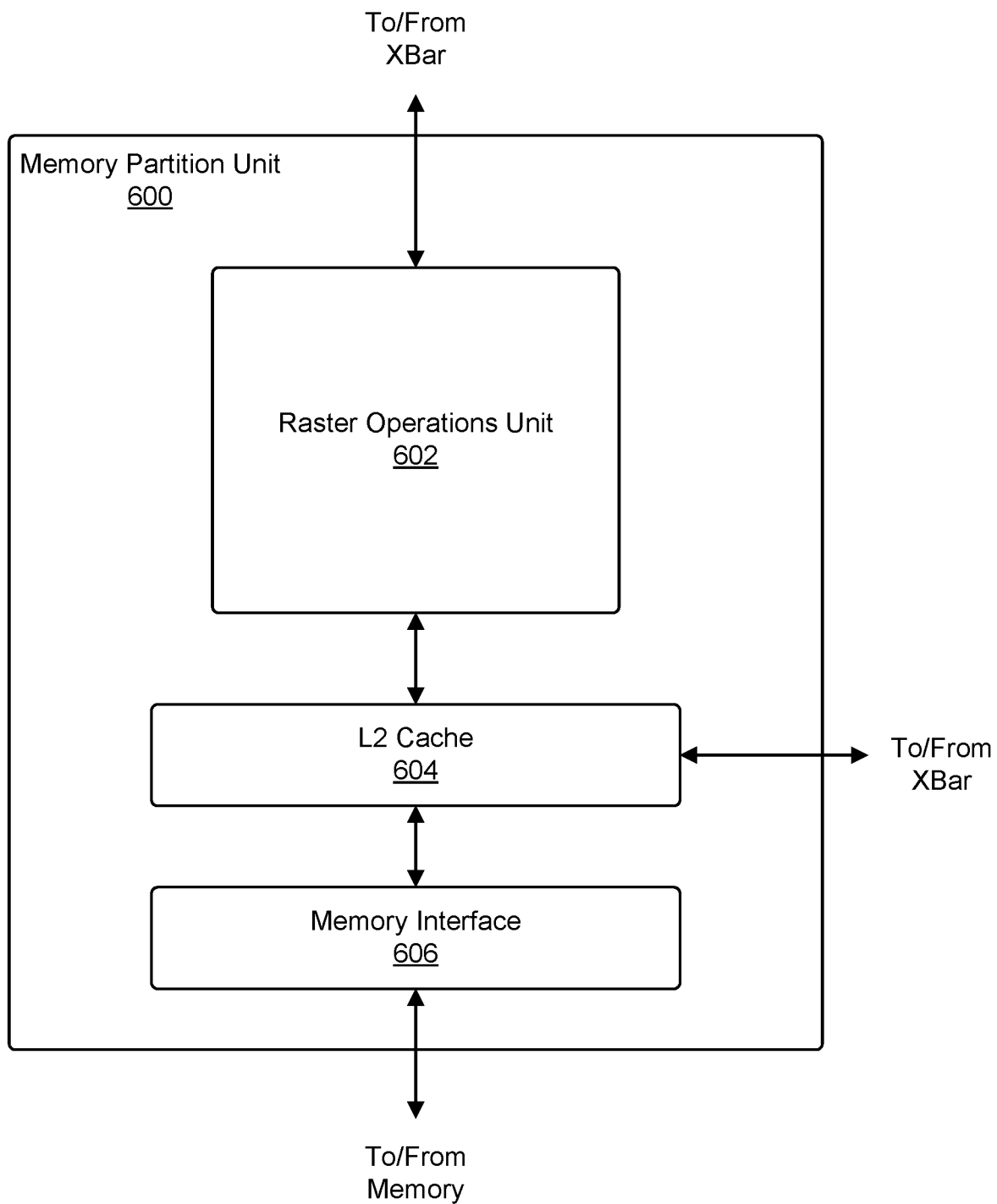
FIG. 6 illustrates a memory partition unit of a parallel processing unit ("PPU"), according to at least one embodiment.

FIG. 6 illustrates a memory partition unit 600 of a parallel processing unit ("PPU"), in accordance with at least one embodiment. In at least one embodiment, memory partition unit 600 includes a Raster Operations ("ROP") unit 602, a level two ("L2") cache 604, a memory interface 606, and any suitable combination thereof. In at least one embodiment, memory interface 606 is coupled to memory. In at least one embodiment, memory interface 606 may implement 32, 64, 128, 1024-bit data buses, or like, for high-speed data transfer. In at least one embodiment, PPU incorporates U memory interfaces 606 where U is a positive integer, with one memory interface 606 per pair of partition units 600, where each pair of partition units 600 is connected to a corresponding memory device. For example, in at least one embodiment, PPU may be connected to up to Y memory devices, such as high bandwidth memory stacks or graphics double-data-rate, version 5, synchronous dynamic random access memory ("GDDR5 SDRAM").

In at least one embodiment, memory interface 606 implements a high bandwidth memory second generation ("HBM2") memory interface and Y equals half of U. In at least one embodiment, HBM2 memory stacks are located on a physical package with a PPU, providing substantial power and area savings compared with conventional GDDR5 SDRAM systems. In at least one embodiment, each HBM2 stack includes four memory dies with Y=4, with each HBM2 stack including two 122-bit channels per die for a total of 8 channels and a data bus width of 1024 bits. In at least one embodiment, that memory supports Single-Error Correcting Double-Error Detecting ("SECDED") Error Correction Code ("ECC") to protect data. In at least one embodiment, ECC can provide higher reliability for compute applications that are sensitive to data corruption.

In at least one embodiment, PPU implements a multi-level memory hierarchy. In at least one embodiment, memory partition unit 600 supports a unified memory to provide a single unified virtual address space for central processing unit ("CPU") and PPU memory, enabling data sharing between virtual memory systems. In at least one embodiment frequency of accesses by a PPU to a memory located on other processors is traced to ensure that memory pages are moved to physical memory of PPU that is accessing pages more frequently. In at least one embodiment, high-speed GPU interconnect 508 supports address translation services allowing PPU to directly access a CPU's page tables and providing full access to CPU memory by a PPU.

In at least one embodiment, copy engines transfer data between multiple PPUs or between PPUs and CPUs. In at least one embodiment, copy engines can generate page faults for addresses that are not mapped into page tables and memory partition unit 600 then services page faults, mapping addresses into page table, after which copy engine performs a transfer. In at least one embodiment, memory is pinned (e.g., non-pageable) for multiple copy engine operations between multiple processors, substantially reducing available memory. In at least one embodiment, with hardware page faulting, addresses can be passed to copy engines without regard as to whether memory pages are resident, and a copy process is transparent.

Data from memory 304 of FIG. 3 or other system memory is fetched by memory partition unit 600 and stored in L2 cache 604, which is located on-chip and is shared between various GPCs, in accordance with at least one embodiment. Each memory partition unit 600, in at least one embodiment, includes at least a portion of L2 cache associated with a corresponding memory device. In at least one embodiment, lower level caches are implemented in various units within GPCs. In at least one embodiment, each of SMs 514 in FIG. 5 may implement a Level 1 ("L1") cache wherein that L1 cache is private memory that is dedicated to a particular SM 514 and data from L2 cache 604 is fetched and stored in each L1 cache for processing in functional units of SMs 514. In at least one embodiment, L2 cache 604 is coupled to memory interface 606 and XBar 420 shown in FIG. 4.

ROP unit 602 performs graphics raster operations related to pixel color, such as color compression, pixel blending, and more, in at least one embodiment. ROP unit 602, in at least one embodiment, implements depth testing in conjunction with raster engine 508, receiving a depth for a sample location associated with a pixel fragment from a culling engine of raster engine 508. In at least one embodiment, depth is tested against a corresponding depth in a depth buffer for a sample location associated with a fragment. In at least one embodiment, if that fragment passes that depth test for that sample location, then ROP unit 602 updates depth buffer and transmits a result of that depth test to raster engine 508. It will be appreciated that a number of partition units 600 may be different than a number of GPCs and, therefore, each ROP unit 602 can, in at least one embodiment, be coupled to each GPC. In at least one embodiment, ROP unit 602 tracks packets received from different GPCs and determines whether a result generated by ROP unit 602 is to be routed to through XBar 520.

Figure 7:
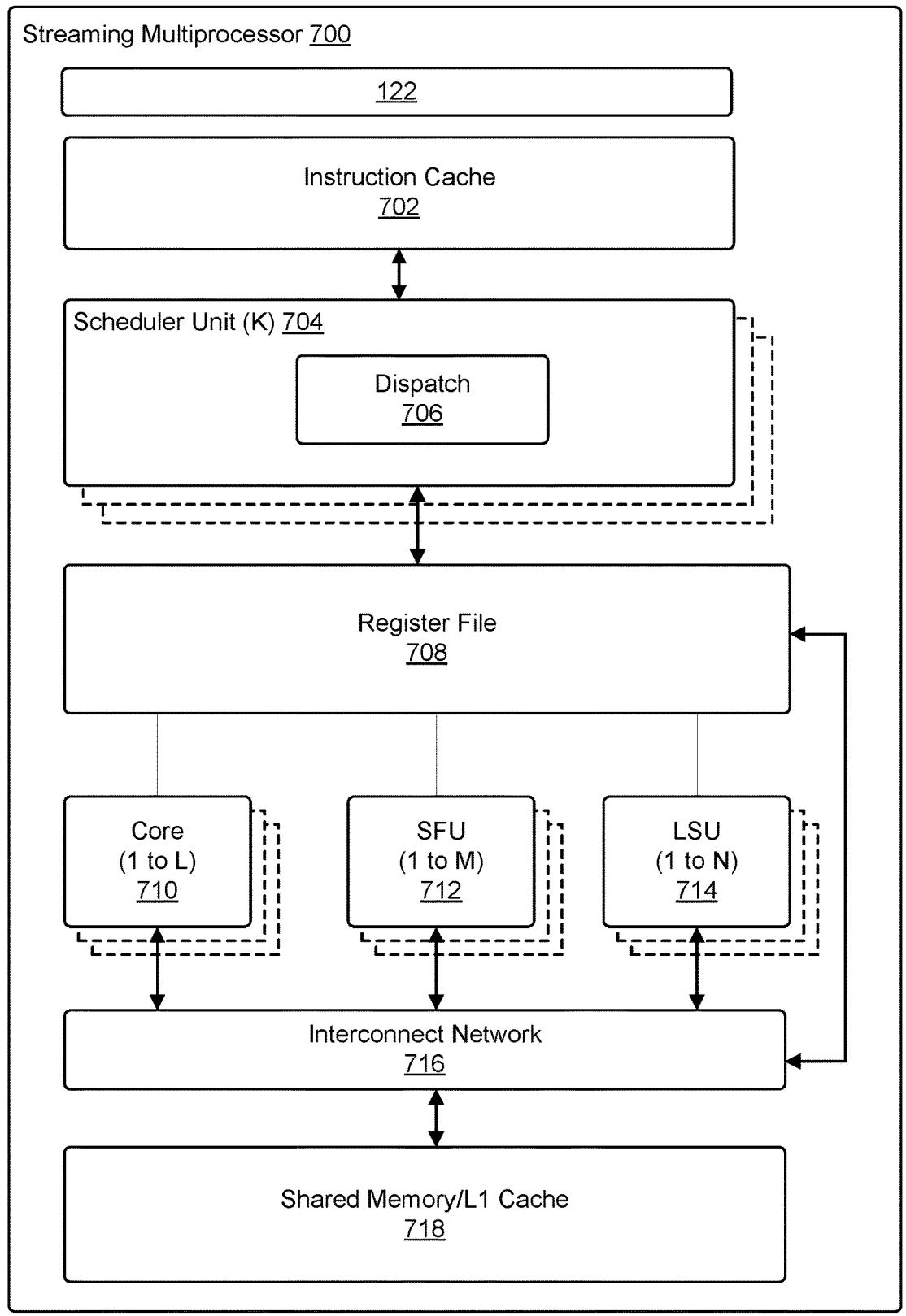
FIG. 7 illustrates a streaming multi-processor, according to at least one embodiment.

FIG. 7 illustrates a streaming multi-processor ("SM") 700, according to at least one embodiment. In at least one embodiment, SM 700 is SM 514 of FIG. 5. In at least one embodiment, SM 700 includes an instruction cache 702, one or more scheduler units 704, a register 708, one or more processing cores ("cores") 710, one or more special function units ("SFUs") 712, one or more load/store units ("LSUs") 714, an interconnect network 716, a shared memory/level one ("L1") cache 718, and/or any suitable combination thereof.

In at least one embodiment, a work distribution unit dispatches tasks for execution on general processing clusters ("GPCs") of parallel processing units ("PPUs") and each task is allocated to a particular Data Processing Cluster ("DPC") within a GPC and, if a task is associated with a shader program, that task is allocated to one of SMs 700. In at least one embodiment, scheduler unit 704 receives tasks from a work distribution unit and manages instruction scheduling for one or more thread blocks assigned to SM 700. In at least one embodiment, scheduler unit 704 schedules thread blocks for execution as warps of parallel threads, wherein each thread block is allocated at least one warp. In at least one embodiment, each warp executes threads. In at least one embodiment, scheduler unit 704 manages a plurality of different thread blocks, allocating warps to different thread blocks and then dispatching instructions from plurality of different cooperative groups to various functional units (e.g., processing cores 710, SFUs 712, and LSUs 714) during each clock cycle.

In at least one embodiment, Cooperative Groups may refer to a programming model for organizing groups of communicating threads that allows developers to express granularity at which threads are communicating, enabling expression of richer, more efficient parallel decompositions. In at least one embodiment, cooperative launch APIs support synchronization amongst thread blocks for execution of parallel algorithms. In at least one embodiment, applications of conventional programming models provide a single, simple construct for synchronizing cooperating threads: a barrier across all threads of a thread block (e.g., syncthreads( )) function). However, in at least one embodiment, programmers may define groups of threads at smaller than thread block granularities and synchronize within defined groups to enable greater performance, design flexibility, and software reuse in form of collective group-wide function interfaces. In at least one embodiment, Cooperative Groups enables programmers to define groups of threads explicitly at sub-block (e.g., as small as a single thread) and multi-block granularities, and to perform collective operations such as synchronization on threads in a cooperative group. In at least one embodiment, that programming model supports clean composition across software boundaries, so that libraries and utility functions can synchronize safely within their local context without having to make assumptions about convergence. In at least one embodiment, Cooperative Groups primitives enable new patterns of cooperative parallelism, including producer-consumer parallelism, opportunistic parallelism, and global synchronization across an entire grid of thread blocks.

In at least one embodiment, a dispatch unit 706 is configured to transmit instructions to one or more functional units and scheduler unit 704 and includes two dispatch units 706 that enable two different instructions from a common warp to be dispatched during each clock cycle. In at least one embodiment, each scheduler unit 704 includes a single dispatch unit 706 or additional dispatch units 706.

In at least one embodiment, each SM 700, in at least one embodiment, includes register 708 that provides a set of registers for functional units of SM 700. In at least one embodiment, register 708 is divided between each functional unit such that each functional unit is allocated a dedicated portion of register 708. In at least one embodiment, register 708 is divided between different warps being executed by SM 700 and register 708 provides temporary storage for operands connected to data paths of functional units. In at least one embodiment, each SM 700 comprises a plurality of L processing cores 710, where L is a positive integer. In at least one embodiment, SM 700 includes a large number (e.g., 122 or more) of distinct processing cores 710. In at least one embodiment, each processing core 710 includes a fully-pipelined, single-precision, double-precision, and/or mixed precision processing unit that includes a floating point arithmetic logic unit and an integer arithmetic logic unit. In at least one embodiment, floating point arithmetic logic units implement IEEE 754-2008 standard for floating point arithmetic. In at least one embodiment, processing cores 710 include 64 single-precision (32-bit) floating point cores, 64 integer cores, 32 double-precision (64-bit) floating point cores, and 8 tensor cores.

Tensor cores are configured to perform matrix operations in accordance with at least one embodiment. In at least one embodiment, one or more tensor cores are included in processing cores 710. In at least one embodiment, tensor cores are configured to perform deep learning matrix arithmetic, such as convolution operations for neural network training and inferencing. In at least one embodiment, each tensor core operates on a 4×4 matrix and performs a matrix multiply and accumulate operation, D=A×B+C, where A, B, C, and D are 4×4 matrices.

In at least one embodiment, matrix multiply inputs A and B are 16-bit floating point matrices and accumulation matrices C and D are 16-bit floating point or 32-bit floating point matrices. In at least one embodiment, tensor cores operate on 16-bit floating point input data with 32-bit floating point accumulation. In at least one embodiment, 16-bit floating point multiply uses 64 operations and results in a full precision product that is then accumulated using 32-bit floating point addition with other intermediate products for a 4×4×4 matrix multiply. Tensor cores are used to perform much larger two-dimensional or higher dimensional matrix operations, built up from these smaller elements, in at least one embodiment. In at least one embodiment, an API, such as a CUDA 9 C++ API, exposes specialized matrix load, matrix multiply and accumulate, and matrix store operations to efficiently use tensor cores from a CUDA-C++ program. In at least one embodiment, at a CUDA level, a warp-level interface assumes 16×16 size matrices spanning all 32 threads of warp.

In at least one embodiment, each SM 700 comprises M SFUs 712 that perform special functions (e.g., attribute evaluation, reciprocal square root, and like). In at least one embodiment, SFUs 712 include a tree traversal unit configured to traverse a hierarchical tree data structure. In at least one embodiment, SFUs 712 include a texture unit configured to perform texture map filtering operations. In at least one embodiment, texture units are configured to load texture maps (e.g., a 2D array of texels) from memory and sample texture maps to produce sampled texture values for use in shader programs executed by SM 700. In at least one embodiment, texture maps are stored in shared memory/L1 cache 718. In at least one embodiment, texture units implement texture operations such as filtering operations using mip-maps (e.g., texture maps of varying levels of detail), in accordance with at least one embodiment. In at least one embodiment, each SM 700 includes two texture units.

Each SM 700 comprises N LSUs 714 that implement load and store operations between shared memory/L1 cache 718 and register 708, in at least one embodiment. Interconnect network 716 connects each functional unit to register 708 and LSU 714 to register 708 and shared memory/L1 cache 718 in at least one embodiment. In at least one embodiment, interconnect network 716 is a crossbar that can be configured to connect any functional units to any registers in register 708 and connect LSUs 714 to register 708 and memory locations in shared memory/L1 cache 718.

In at least one embodiment, shared memory/L1 cache 718 is an array of on-chip memory that allows for data storage and communication between SM 700 and primitive engine and between threads in SM 700, in at least one embodiment. In at least one embodiment, shared memory/L1 cache 718 comprises 122 KB of storage capacity and is in a path from SM 700 to a partition unit. In at least one embodiment, shared memory/L1 cache 718, in at least one embodiment, is used to cache reads and writes. In at least one embodiment, one or more of shared memory/L1 cache 718, L2 cache, and memory are backing stores.

Combining data cache and shared memory functionality into a single memory block provides improved performance for both types of memory accesses, in at least one embodiment. In at least one embodiment, capacity is used or is usable as a cache by programs that do not use shared memory, such as if shared memory is configured to use half of a capacity, and texture and load/store operations can use remaining capacity. Integration within shared memory/L1 cache 718 enables shared memory/L1 cache 718 to function as a high-throughput conduit for streaming data while simultaneously providing high-bandwidth and low-latency access to frequently reused data, in accordance with at least one embodiment. In at least one embodiment, when configured for general purpose parallel computation, a simpler configuration can be used compared with graphics processing. In at least one embodiment, fixed function graphics processing units are bypassed, creating a much simpler programming model. In a general purpose parallel computation configuration, a work distribution unit assigns and distributes blocks of threads directly to DPCs, in at least one embodiment. In at least one embodiment, threads in a block execute a common program, using a unique thread ID in calculation to ensure each thread generates unique results, using SM 700 to execute program and perform calculations, shared memory/L1 cache 718 to communicate between threads, and LSU 714 to read and write global memory through shared memory/L1 cache 718 and memory partition unit. In at least one embodiment, when configured for general purpose parallel computation, SM 700 writes commands that scheduler unit 704 can use to launch new work on DPCs.

In at least one embodiment, a PPU is included in or coupled to a desktop computer, a laptop computer, a tablet computer, servers, supercomputers, a smart-phone (e.g., a wireless, hand-held device), personal digital assistant ("PDA"), a digital camera, a vehicle, a head mounted display, a hand-held electronic device, and more. In at least one embodiment, a PPU is embodied on a single semiconductor substrate. In at least one embodiment, a PPU is included in a system-on-a-chip ("SoC") along with one or more other devices such as additional PPUs, memory, a reduced instruction set computer ("RISC") CPU, a memory management unit ("MMU"), a digital-to-analog converter ("DAC"), and like.

In at least one embodiment, a PPU may be included on a graphics card that includes one or more memory devices. In at least one embodiment, that graphics card may be configured to interface with a PCIe slot on a motherboard of a desktop computer. In at least one embodiment, that PPU may be an integrated graphics processing unit ("iGPU") included in chipset of a motherboard.

QoS policy evaluation manager 122 may be used to evaluate the optimality of a QoS policy used to provide an application session (e.g., a cloud gaming session) and make improvements thereto. Details regarding QoS policy evaluation manager 122 are provided herein in conjunction with FIG. 1. In at least one embodiment, QoS policy evaluation manager 122 may be used in the SM 700 of FIG. 7 for evaluating the optimality of a QoS policy used to provide an application session (e.g., a cloud gaming session) and make improvements thereto.

Figure 8:
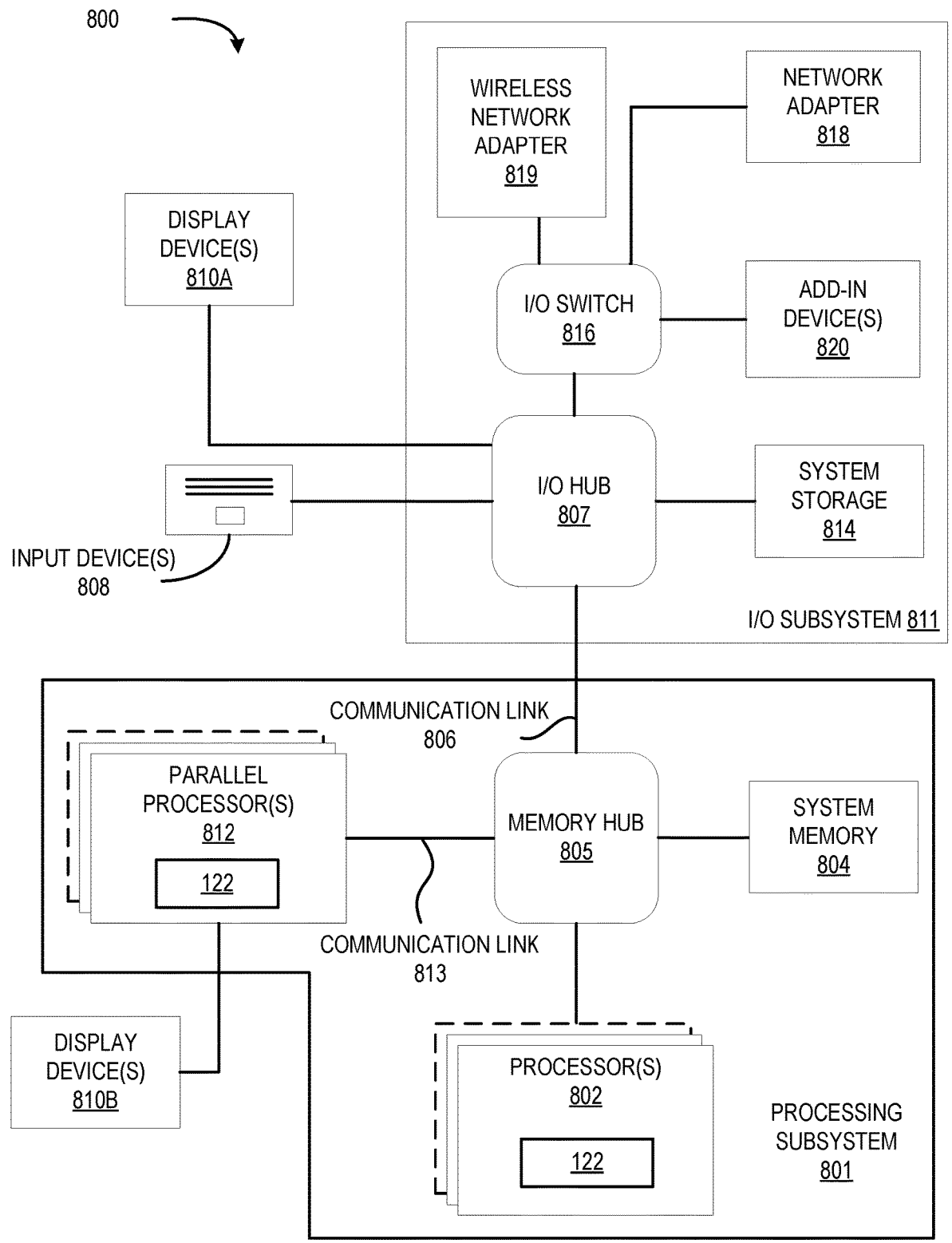
FIG. 8 illustrates a computer system, according to at least one embodiment.

FIG. 8 is a block diagram illustrating a computing system 800 according to at least one embodiment. In at least one embodiment, computing system 800 includes a processing subsystem 801 having one or more processor(s) 802 and a system memory 804 communicating via an interconnection path that may include a memory hub 805. In at least one embodiment, memory hub 805 may be a separate component within a chipset component or may be integrated within one or more processor(s) 802. In at least one embodiment, memory hub 805 couples with an I/O subsystem 811 via a communication link 806. In at least one embodiment, I/O subsystem 811 includes an I/O hub 807 that can enable computing system 800 to receive input from one or more input device(s) 808. In at least one embodiment, I/O hub 807 can enable a display controller, which may be included in one or more processor(s) 802, to provide outputs to one or more display device(s) 810A. In at least one embodiment, one or more display device(s) 810A coupled with I/O hub 807 can include a local, internal, or embedded display device.

In at least one embodiment, processing subsystem 801 includes one or more parallel processor(s) 812 coupled to memory hub 805 via a bus or other communication link 813. In at least one embodiment, communication link 813 may use one of any number of standards based communication link technologies or protocols, such as, but not limited to PCI Express, or may be a vendor-specific communications interface or communications fabric. In at least one embodiment, one or more parallel processor(s) 812 form a computationally focused parallel or vector processing system that can include a large number of processing cores and/or processing clusters, such as a many-integrated core (MIC) processor. In at least one embodiment, some or all of parallel processor(s) 812 form a graphics processing subsystem that can output pixels to one of one or more display device(s) 810A coupled via I/O Hub 807. In at least one embodiment, parallel processor(s) 812 can also include a display controller and display interface (not shown) to enable a direct connection to one or more display device(s) 810B.

In at least one embodiment, a system storage unit 814 can connect to I/O hub 807 to provide a storage mechanism for computing system 800. In at least one embodiment, an I/O switch 816 can be used to provide an interface mechanism to enable connections between I/O hub 807 and other components, such as a network adapter 818 and/or a wireless network adapter 819 that may be integrated into platform, and various other devices that can be added via one or more add-in device(s) 820. In at least one embodiment, network adapter 818 can be an Ethernet adapter or another wired network adapter. In at least one embodiment, wireless network adapter 819 can include one or more of a Wi-Fi, Bluetooth, near field communication (NFC), or other network device that includes one or more wireless radios.

In at least one embodiment, computing system 800 can include other components not explicitly shown, including USB or other port connections, optical storage drives, video capture devices, and like, may also be connected to I/O hub 807. In at least one embodiment, communication paths interconnecting various components in FIG. 8 may be implemented using any suitable protocols, such as PCI (Peripheral Component Interconnect) based protocols (e.g., PCI-Express), or other bus or point-to-point communication interfaces and/or protocol(s), such as NV-Link high-speed interconnect, or interconnect protocols.

In at least one embodiment, parallel processor(s) 812 incorporate circuitry optimized for graphics and video processing, including, for example, video output circuitry, and constitutes a graphics processing unit (GPU). In at least one embodiment, parallel processor(s) 812 incorporate circuitry optimized for general purpose processing. In at least one embodiment, components of computing system 800 may be integrated with one or more other system elements on a single integrated circuit. For example, in at least one embodiment, parallel processor(s) 812, memory hub 805, processor(s) 802, and I/O hub 807 can be integrated into a system on chip (SoC) integrated circuit. In at least one embodiment, components of computing system 800 can be integrated into a single package to form a system in package (SIP) configuration. In at least one embodiment, at least a portion of components of computing system 800 can be integrated into a multi-chip module (MCM), which can be interconnected with other multi-chip modules into a modular computing system.

QoS policy evaluation manager 122 may be used to evaluate the optimality of a QoS policy used to provide an application session (e.g., a cloud gaming session) and make improvements thereto. Details regarding QoS policy evaluation manager 122 are provided herein in conjunction with FIG. 1. In at least one embodiment, QoS policy evaluation manager 122 may be used in the system of FIG. 8 for evaluating the optimality of a QoS policy used to provide an application session (e.g., a cloud gaming session) and make improvements thereto.

Figure 9A:
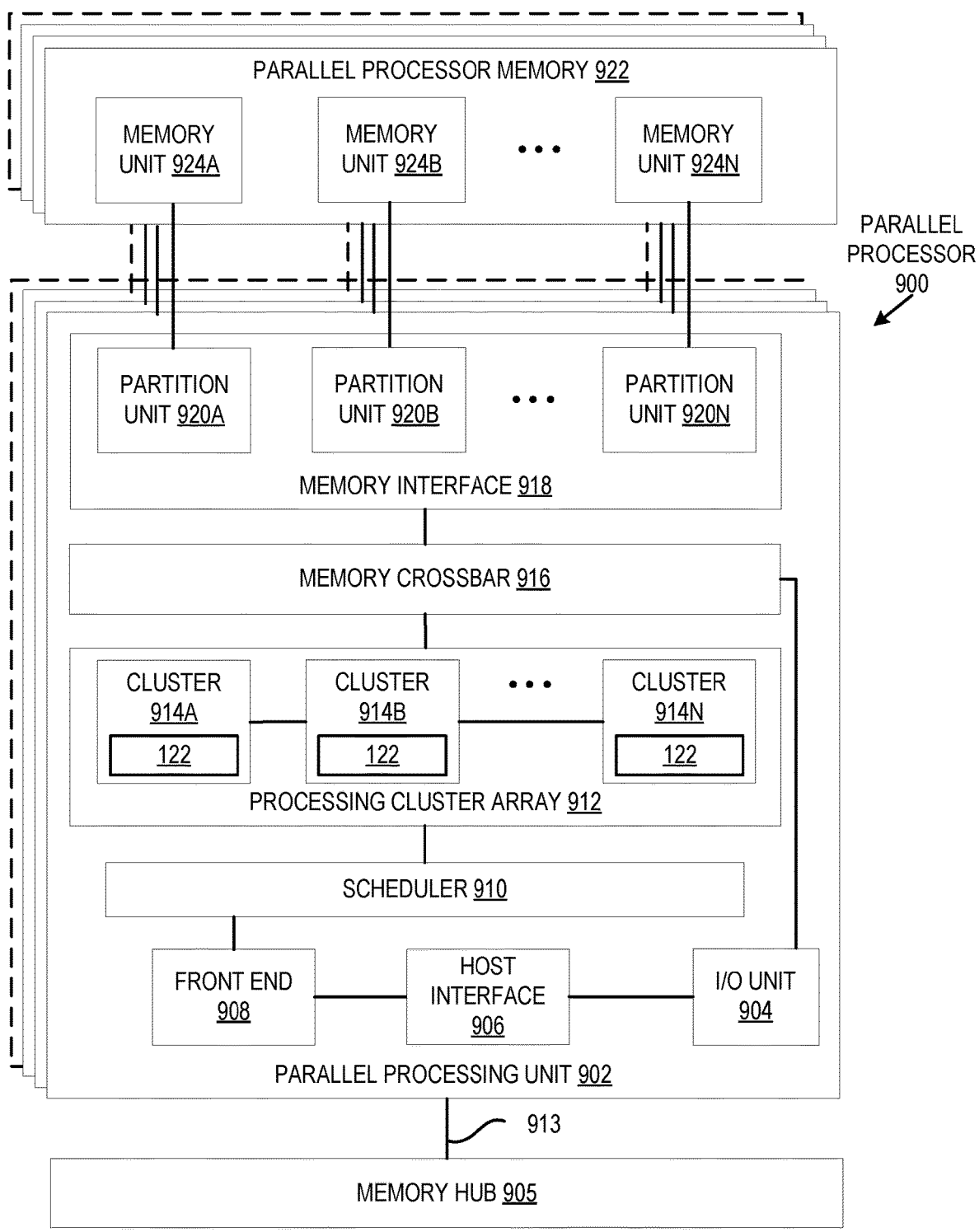
FIG. 9A illustrates a parallel processor, according to at least one embodiment.

FIG. 9A illustrates a parallel processor 900 according to at least one embodiment. In at least one embodiment, various components of parallel processor 900 may be implemented using one or more integrated circuit devices, such as programmable processors, application specific integrated circuits (ASICs), or field programmable gate arrays (FPGA). In at least one embodiment, illustrated parallel processor 900 is a variant of the one or more parallel processor(s) 812 shown in FIG. 8.

In at least one embodiment, parallel processor 900 includes a parallel processing unit 902. In at least one embodiment, parallel processing unit 902 includes an I/O unit 904 that enables communication with other devices, including other instances of parallel processing unit 902. In at least one embodiment, I/O unit 904 may be directly connected to other devices. In at least one embodiment, I/O unit 904 connects with other devices via use of a hub or switch interface, such as a memory hub 905. In at least one embodiment, connections between memory hub 905 and I/O unit 904 form a communication link 913. In at least one embodiment, I/O unit 904 connects with a host interface 906 and a memory crossbar 916, where host interface 906 receives commands directed to performing processing operations and memory crossbar 916 receives commands directed to performing memory operations.

In at least one embodiment, when host interface 906 receives a command buffer via I/O unit 904, host interface 906 can direct operations to perform those commands to a front end 908. In at least one embodiment, front end 908 couples with a scheduler 910, which is configured to distribute commands or other work items to a processing cluster array 912. In at least one embodiment, scheduler 910 ensures that processing cluster array 912 is properly configured and in a valid state before tasks are distributed to a cluster of processing cluster array 912. In at least one embodiment, scheduler 910 is implemented via firmware logic executing on a microcontroller. In at least one embodiment, microcontroller implemented scheduler 910 is configurable to perform complex scheduling and work distribution operations at coarse and fine granularity, e.g., enabling rapid preemption and context switching of threads executing on processing array 912. In at least one embodiment, host software can prove workloads for scheduling on processing cluster array 912 via one of multiple graphics processing paths. In at least one embodiment, workloads can then be automatically distributed across processing array cluster 912 by scheduler 910 logic within a microcontroller including scheduler 910.

In at least one embodiment, processing cluster array 912 can include up to "N" processing clusters (e.g., cluster 914A, cluster 914B, through cluster 914N), where "N" represents a positive integer (which may be a different integer "N" than used in other figures). In at least one embodiment, each cluster 914A-914N of processing cluster array 912 can execute a large number of concurrent threads. In at least one embodiment, scheduler 910 can allocate work to clusters 914A-914N of processing cluster array 912 using various scheduling and/or work distribution algorithms, which may vary depending on workload arising for each type of program or computation. In at least one embodiment, scheduling can be handled dynamically by scheduler 910, or can be assisted in part by compiler logic during compilation of program logic configured for execution by processing cluster array 912. In at least one embodiment, different clusters 914A-914N of processing cluster array 912 can be allocated for processing different types of programs or for performing different types of computations.

In at least one embodiment, processing cluster array 912 can be configured to perform various types of parallel processing operations. In at least one embodiment, processing cluster array 912 is configured to perform general-purpose parallel compute operations. For example, in at least one embodiment, processing cluster array 912 can include logic to execute processing tasks including filtering of video and/or audio data, performing modeling operations, including physics operations, and performing data transformations.

In at least one embodiment, processing cluster array 912 is configured to perform parallel graphics processing operations. In at least one embodiment, processing cluster array 912 can include additional logic to support execution of such graphics processing operations, including but not limited to, texture sampling logic to perform texture operations, as well as tessellation logic and other vertex processing logic. In at least one embodiment, processing cluster array 912 can be configured to execute graphics processing related shader programs, for example, such as vertex shaders, tessellation shaders, geometry shaders, and pixel shaders. In at least one embodiment, parallel processing unit 902 can transfer data from system memory via I/O unit 904 for processing. In at least one embodiment, during processing, transferred data can be stored to on-chip memory (e.g., parallel processor memory 922) during processing, then written back to system memory.

In at least one embodiment, when parallel processing unit 902 is used to perform graphics processing, scheduler 910 can be configured to divide a processing workload into approximately equal sized tasks, to better enable distribution of graphics processing operations to multiple clusters 914A-914N of processing cluster array 912. In at least one embodiment, portions of processing cluster array 912 can be configured to perform different types of processing. For example, in at least one embodiment, a first portion may be configured to perform vertex shading and topology generation, a second portion may be configured to perform tessellation and geometry shading, and a third portion may be configured to perform pixel shading or other screen space operations, to produce a rendered image for display. In at least one embodiment, intermediate data produced by one or more of clusters 914A-914N may be stored in buffers to allow intermediate data to be transmitted between clusters 914A-914N for further processing.

In at least one embodiment, processing cluster array 912 can receive processing tasks to be executed via scheduler 910, which receives commands defining processing tasks from front end 908. In at least one embodiment, processing tasks can include indices of data to be processed, e.g., surface (patch) data, primitive data, vertex data, and/or pixel data, as well as state parameters and commands defining how data is to be processed (e.g., what program is to be executed). In at least one embodiment, scheduler 910 may be configured to fetch indices corresponding to tasks or may receive indices from front end 908. In at least one embodiment, front end 908 can be configured to ensure processing cluster array 912 is configured to a valid state before a workload specified by incoming command buffers (e.g., batch-buffers, push buffers, etc.) is initiated.

In at least one embodiment, each of one or more instances of parallel processing unit 902 can couple with a parallel processor memory 922. In at least one embodiment, parallel processor memory 922 can be accessed via memory crossbar 916, which can receive memory requests from processing cluster array 912 as well as I/O unit 904. In at least one embodiment, memory crossbar 916 can access parallel processor memory 922 via a memory interface 918. In at least one embodiment, memory interface 918 can include multiple partition units (e.g., partition unit 920A, partition unit 920B, through partition unit 920N) that can each couple to a portion (e.g., memory unit) of parallel processor memory 922. In at least one embodiment, a number of partition units 920A-920N is configured to be equal to a number of memory units, such that a first partition unit 920A has a corresponding first memory unit 924A, a second partition unit 920B has a corresponding memory unit 924B, and an N-th partition unit 920N has a corresponding N-th memory unit 924N. In at least one embodiment, a number of partition units 920A-920N may not be equal to a number of memory units.

In at least one embodiment, memory units 924A-924N can include various types of memory devices, including dynamic random access memory (DRAM) or graphics random access memory, such as synchronous graphics random access memory (SGRAM), including graphics double data rate (GDDR) memory. In at least one embodiment, memory units 924A-924N may also include 3D stacked memory, including but not limited to high bandwidth memory (HBM). In at least one embodiment, render targets, such as frame buffers or texture maps may be stored across memory units 924A-924N, allowing partition units 920A-920N to write portions of each render target in parallel to efficiently use available bandwidth of parallel processor memory 922. In at least one embodiment, a local instance of parallel processor memory 922 may be excluded in favor of a unified memory design that utilizes system memory in conjunction with local cache memory.

In at least one embodiment, any one of clusters 914A-914N of processing cluster array 912 can process data that will be written to any of memory units 924A-924N within parallel processor memory 922. In at least one embodiment, memory crossbar 916 can be configured to transfer an output of each cluster 914A-914N to any partition unit 920A-920N or to another cluster 914A-914N, which can perform additional processing operations on an output. In at least one embodiment, each cluster 914A-914N can communicate with memory interface 918 through memory crossbar 916 to read from or write to various external memory devices. In at least one embodiment, memory crossbar 916 has a connection to memory interface 918 to communicate with I/O unit 904, as well as a connection to a local instance of parallel processor memory 922, enabling processing units within different processing clusters 914A-914N to communicate with system memory or other memory that is not local to parallel processing unit 902. In at least one embodiment, memory crossbar 916 can use virtual channels to separate traffic streams between clusters 914A-914N and partition units 920A-920N.

In at least one embodiment, multiple instances of parallel processing unit 902 can be provided on a single add-in card, or multiple add-in cards can be interconnected. In at least one embodiment, different instances of parallel processing unit 902 can be configured to interoperate even if different instances have different numbers of processing cores, different amounts of local parallel processor memory, and/or other configuration differences. For example, in at least one embodiment, some instances of parallel processing unit 902 can include higher precision floating point units relative to other instances. In at least one embodiment, systems incorporating one or more instances of parallel processing unit 902 or parallel processor 900 can be implemented in a variety of configurations and form factors, including but not limited to desktop, laptop, or handheld personal computers, servers, workstations, game consoles, and/or embedded systems.

Figure 9B:
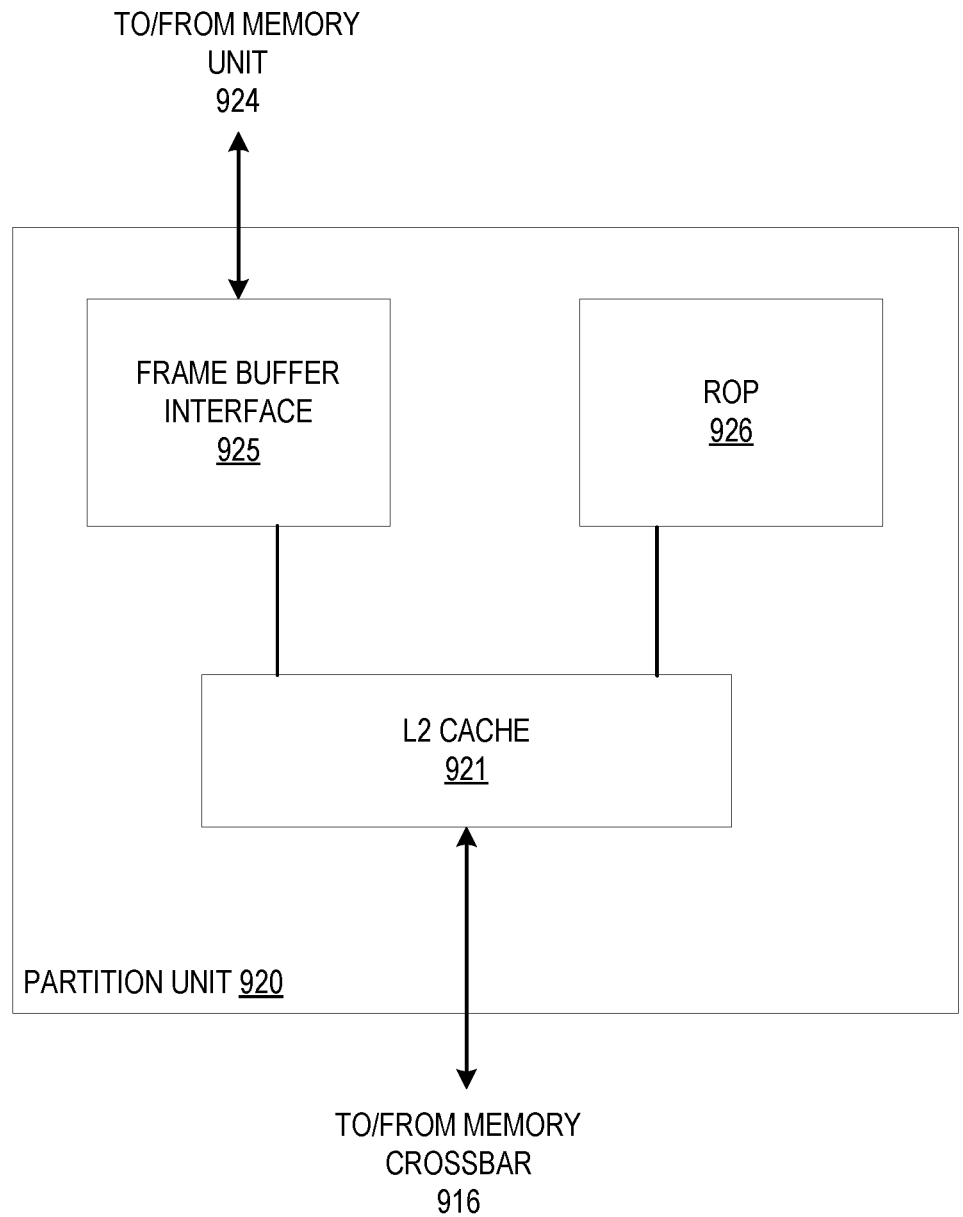
FIG. 9B illustrates a partition unit, according to at least one embodiment.

FIG. 9B is a block diagram of a partition unit 920 according to at least one embodiment. In at least one embodiment, partition unit 920 is an instance of one of partition units 920A-920N of FIG. 9A. In at least one embodiment, partition unit 920 includes an L2 cache 921, a frame buffer interface 925, and a ROP 926 (raster operations unit). In at least one embodiment, L2 cache 921 is a read/write cache that is configured to perform load and store operations received from memory crossbar 916 and ROP 926. In at least one embodiment, read misses and urgent write-back requests are output by L2 cache 921 to frame buffer interface 925 for processing. In at least one embodiment, updates can also be sent to a frame buffer via frame buffer interface 925 for processing. In at least one embodiment, frame buffer interface 925 interfaces with one of memory units in parallel processor memory, such as memory units 924A-924N of FIG. 9 (e.g., within parallel processor memory 922).

In at least one embodiment, ROP 926 is a processing unit that performs raster operations such as stencil, z test, blending, etc. In at least one embodiment, ROP 926 then outputs processed graphics data that is stored in graphics memory. In at least one embodiment, ROP 926 includes compression logic to compress depth or color data that is written to memory and decompress depth or color data that is read from memory. In at least one embodiment, compression logic can be lossless compression logic that makes use of one or more of multiple compression algorithms. In at least one embodiment, a type of compression that is performed by ROP 926 can vary based on statistical characteristics of data to be compressed. For example, in at least one embodiment, delta color compression is performed on depth and color data on a per-tile basis.

In at least one embodiment, ROP 926 is included within each processing cluster (e.g., cluster 914A-914N of FIG. 9A) instead of within partition unit 920. In at least one embodiment, read and write requests for pixel data are transmitted over memory crossbar 916 instead of pixel fragment data. In at least one embodiment, processed graphics data may be displayed on a display device, such as one of one or more display device(s) 810 of FIG. 8, routed for further processing by processor(s) 802, or routed for further processing by one of processing entities within parallel processor 900 of FIG. 9A.

Figure 9C:
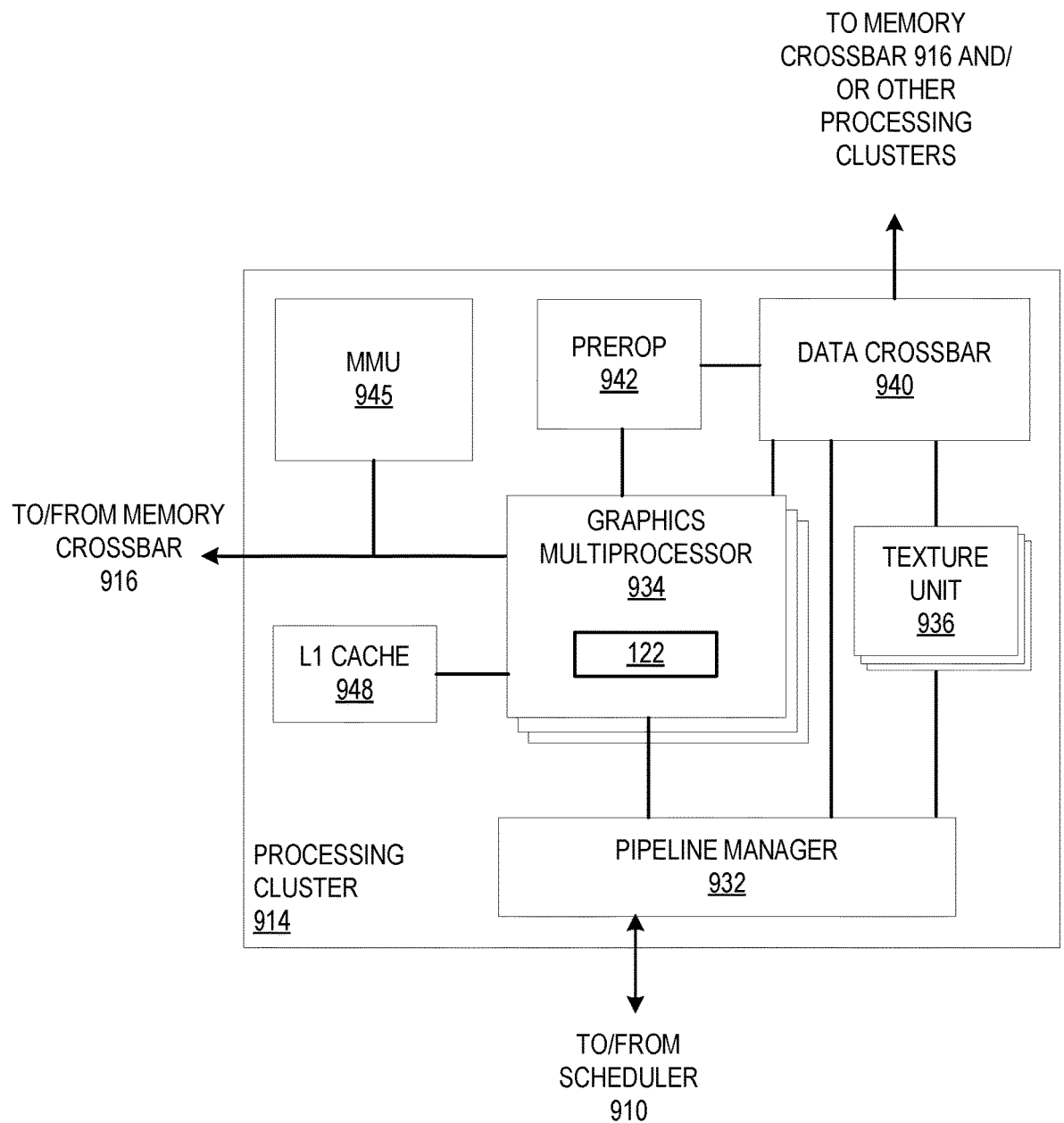
FIG. 9C illustrates a processing cluster, according to at least one embodiment.

FIG. 9C is a block diagram of a processing cluster 914 within a parallel processing unit according to at least one embodiment. In at least one embodiment, a processing cluster is an instance of one of processing clusters 914A-914N of FIG. 9A. In at least one embodiment, processing cluster 914 can be configured to execute many threads in parallel, where "thread" refers to an instance of a particular program executing on a particular set of input data. In at least one embodiment, single-instruction, multiple-data (SIMD) instruction issue techniques are used to support parallel execution of a large number of threads without providing multiple independent instruction units. In at least one embodiment, single-instruction, multiple-thread (SIMT) techniques are used to support parallel execution of a large number of generally synchronized threads, using a common instruction unit configured to issue instructions to a set of processing engines within each one of processing clusters.

In at least one embodiment, operation of processing cluster 914 can be controlled via a pipeline manager 932 that distributes processing tasks to SIMT parallel processors. In at least one embodiment, pipeline manager 932 receives instructions from scheduler 910 of FIG. 9A and manages execution of those instructions via a graphics multiprocessor 934 and/or a texture unit 936. In at least one embodiment, graphics multiprocessor 934 is an exemplary instance of a SIMT parallel processor. However, in at least one embodiment, various types of SIMT parallel processors of differing architectures may be included within processing cluster 914. In at least one embodiment, one or more instances of graphics multiprocessor 934 can be included within a processing cluster 914. In at least one embodiment, graphics multiprocessor 934 can process data and a data crossbar 940 can be used to distribute processed data to one of multiple possible destinations, including other shader units. In at least one embodiment, pipeline manager 932 can facilitate distribution of processed data by specifying destinations for processed data to be distributed via data crossbar 940.

In at least one embodiment, each graphics multiprocessor 934 within processing cluster 914 can include an identical set of functional execution logic (e.g., arithmetic logic units, load-store units, etc.). In at least one embodiment, functional execution logic can be configured in a pipelined manner in which new instructions can be issued before previous instructions are complete. In at least one embodiment, functional execution logic supports a variety of operations including integer and floating point arithmetic, comparison operations, Boolean operations, bit-shifting, and computation of various algebraic functions. In at least one embodiment, same functional-unit hardware can be leveraged to perform different operations and any combination of functional units may be present.

In at least one embodiment, instructions transmitted to processing cluster 914 constitute a thread. In at least one embodiment, a set of threads executing across a set of parallel processing engines is a thread group. In at least one embodiment, a thread group executes a common program on different input data. In at least one embodiment, each thread within a thread group can be assigned to a different processing engine within a graphics multiprocessor 934. In at least one embodiment, a thread group may include fewer threads than a number of processing engines within graphics multiprocessor 934. In at least one embodiment, when a thread group includes fewer threads than a number of processing engines, one or more of processing engines may be idle during cycles in which that thread group is being processed. In at least one embodiment, a thread group may also include more threads than a number of processing engines within graphics multiprocessor 934. In at least one embodiment, when a thread group includes more threads than number of processing engines within graphics multiprocessor 934, processing can be performed over consecutive clock cycles. In at least one embodiment, multiple thread groups can be executed concurrently on a graphics multiprocessor 934.

In at least one embodiment, graphics multiprocessor 934 includes an internal cache memory to perform load and store operations. In at least one embodiment, graphics multiprocessor 934 can forego an internal cache and use a cache memory (e.g., L1 cache 948) within processing cluster 914. In at least one embodiment, each graphics multiprocessor 934 also has access to L2 caches within partition units (e.g., partition units 920A-920N of FIG. 9A) that are shared among all processing clusters 914 and may be used to transfer data between threads. In at least one embodiment, graphics multiprocessor 934 may also access off-chip global memory, which can include one or more of local parallel processor memory and/or system memory. In at least one embodiment, any memory external to parallel processing unit 902 may be used as global memory. In at least one embodiment, processing cluster 914 includes multiple instances of graphics multiprocessor 934 and can share common instructions and data, which may be stored in L1 cache 948.

In at least one embodiment, each processing cluster 914 may include an MMU 945 (memory management unit) that is configured to map virtual addresses into physical addresses. In at least one embodiment, one or more instances of MMU 945 may reside within memory interface 918 of FIG. 9A. In at least one embodiment, MMU 945 includes a set of page table entries (PTEs) used to map a virtual address to a physical address of a tile and optionally a cache line index. In at least one embodiment, MMU 945 may include address translation lookaside buffers (TLB) or caches that may reside within graphics multiprocessor 934 or L1 948 cache or processing cluster 914. In at least one embodiment, a physical address is processed to distribute surface data access locally to allow for efficient request interleaving among partition units. In at least one embodiment, a cache line index may be used to determine whether a request for a cache line is a hit or miss.

In at least one embodiment, a processing cluster 914 may be configured such that each graphics multiprocessor 934 is coupled to a texture unit 936 for performing texture mapping operations, e.g., determining texture sample positions, reading texture data, and filtering texture data. In at least one embodiment, texture data is read from an internal texture L1 cache (not shown) or from an L1 cache within graphics multiprocessor 934 and is fetched from an L2 cache, local parallel processor memory, or system memory, as needed. In at least one embodiment, each graphics multiprocessor 934 outputs processed tasks to data crossbar 940 to provide processed task to another processing cluster 914 for further processing or to store processed task in an L2 cache, local parallel processor memory, or system memory via memory crossbar 916. In at least one embodiment, a preROP 942 (pre-raster operations unit) is configured to receive data from graphics multiprocessor 934, and direct data to ROP units, which may be located with partition units as described herein (e.g., partition units 920A-920N of FIG. 9A). In at least one embodiment, preROP 942 unit can perform optimizations for color blending, organizing pixel color data, and performing address translations.

QoS policy evaluation manager 122 may be used to evaluate the optimality of a QoS policy used to provide an application session (e.g., a cloud gaming session) and make improvements thereto. Details regarding QoS policy evaluation manager 122 are provided herein in conjunction with FIG. 1. In at least one embodiment, QoS policy evaluation manager 122 may be used in the processing cluster 914 of FIG. 9C for evaluating the optimality of a QoS policy used to provide an application session (e.g., a cloud gaming session) and make improvements thereto.

Figure 9D:
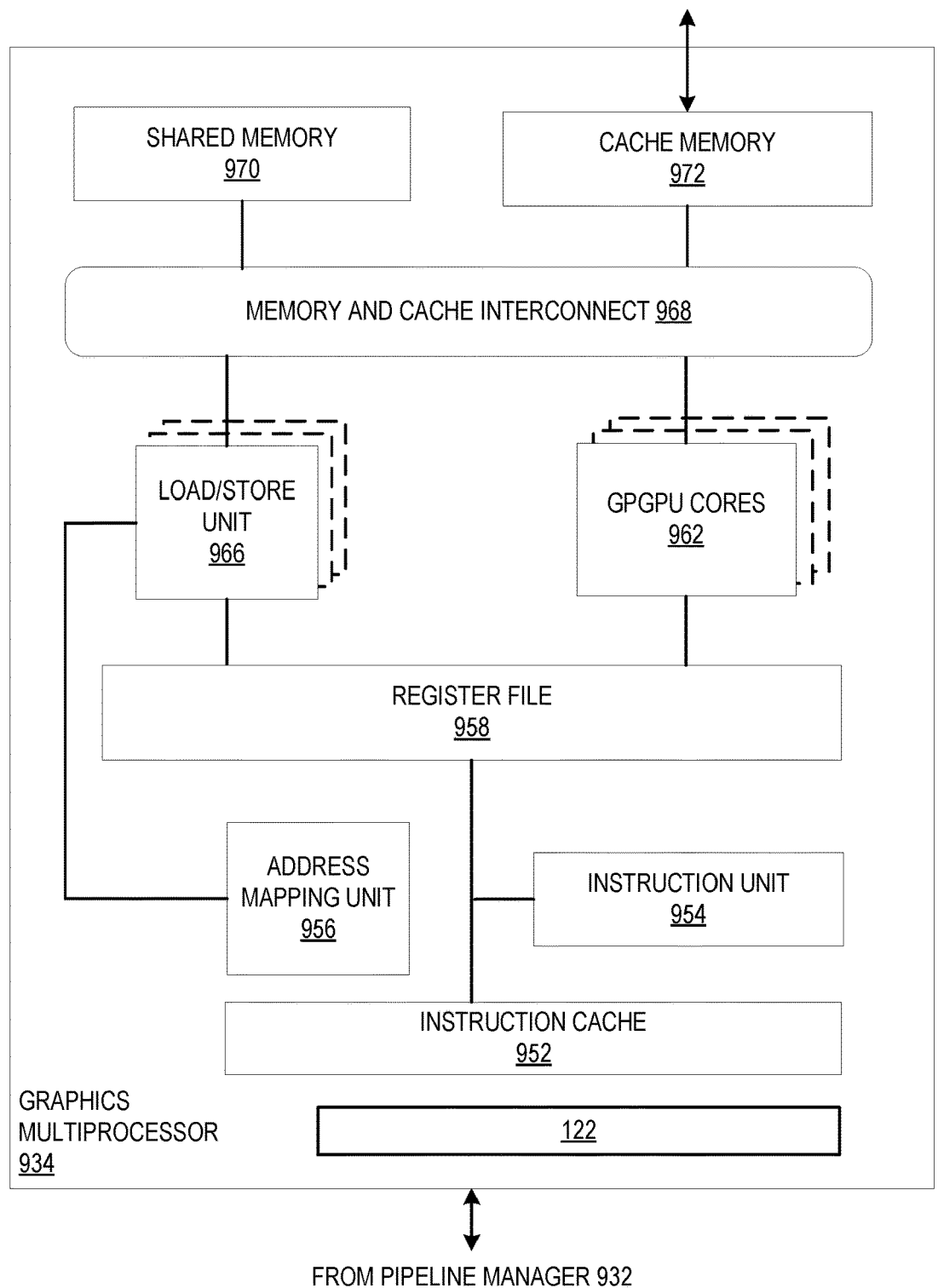
FIG. 9D illustrates a graphics multiprocessor, according to at least one embodiment.

FIG. 9D shows a graphics multiprocessor 934 according to at least one embodiment. In at least one embodiment, graphics multiprocessor 934 couples with pipeline manager 932 of processing cluster 914. In at least one embodiment, graphics multiprocessor 934 has an execution pipeline including but not limited to an instruction cache 952, an instruction unit 954, an address mapping unit 956, a register 958, one or more general purpose graphics processing unit (GPGPU) cores 962, and one or more load/store units 966. In at least one embodiment, GPGPU cores 962 and load/store units 966 are coupled with cache memory 972 and shared memory 970 via a memory and cache interconnect 968.

In at least one embodiment, instruction cache 952 receives a stream of instructions to execute from pipeline manager 932. In at least one embodiment, instructions are cached in instruction cache 952 and dispatched for execution by an instruction unit 954. In at least one embodiment, instruction unit 954 can dispatch instructions as thread groups (e.g., warps), with each thread of thread group assigned to a different execution unit within GPGPU cores 962. In at least one embodiment, an instruction can access any of a local, shared, or global address space by specifying an address within a unified address space. In at least one embodiment, address mapping unit 956 can be used to translate addresses in a unified address space into a distinct memory address that can be accessed by load/store units 966.

In at least one embodiment, register 958 provides a set of registers for functional units of graphics multiprocessor 934. In at least one embodiment, register 958 provides temporary storage for operands connected to data paths of functional units (e.g., GPGPU cores 962, load/store units 966) of graphics multiprocessor 934. In at least one embodiment, register 958 is divided between each of functional units such that each functional unit is allocated a dedicated portion of register 958. In at least one embodiment, register 958 is divided between different warps being executed by graphics multiprocessor 934.

In at least one embodiment, GPGPU cores 962 can each include floating point units (FPUs) and/or integer arithmetic logic units (ALUs) that are used to execute instructions of graphics multiprocessor 934. In at least one embodiment, GPGPU cores 962 can be similar in architecture or can differ in architecture. In at least one embodiment, a first portion of GPGPU cores 962 include a single precision FPU and an integer ALU while a second portion of GPGPU cores include a double precision FPU. In at least one embodiment, FPUs can implement IEEE 754-2008 standard floating point arithmetic or enable variable precision floating point arithmetic. In at least one embodiment, graphics multiprocessor 934 can additionally include one or more fixed function or special function units to perform specific functions such as copy rectangle or pixel blending operations. In at least one embodiment, one or more of GPGPU cores 962 can also include fixed or special function logic.

In at least one embodiment, GPGPU cores 962 include SIMD logic capable of performing a single instruction on multiple sets of data. In at least one embodiment, GPGPU cores 962 can physically execute SIMD4, SIMD8, and SIMD16 instructions and logically execute SIMD1, SIMD2, and SIMD32 instructions. In at least one embodiment, SIMD instructions for GPGPU cores can be generated at compile time by a shader compiler or automatically generated when executing programs written and compiled for single program multiple data (SPMD) or SIMT architectures. In at least one embodiment, multiple threads of a program configured for an SIMT execution model can executed via a single SIMD instruction. For example, in at least one embodiment, eight SIMT threads that perform same or similar operations can be executed in parallel via a single SIMD8 logic unit.

In at least one embodiment, memory and cache interconnect 968 is an interconnect network that connects each functional unit of graphics multiprocessor 934 to register 958 and to shared memory 970. In at least one embodiment, memory and cache interconnect 968 is a crossbar interconnect that allows load/store unit 966 to implement load and store operations between shared memory 970 and register 958. In at least one embodiment, register 958 can operate at a same frequency as GPGPU cores 962, thus data transfer between GPGPU cores 962 and register 958 can have very low latency. In at least one embodiment, shared memory 970 can be used to enable communication between threads that execute on functional units within graphics multiprocessor 934. In at least one embodiment, cache memory 972 can be used as a data cache for example, to cache texture data communicated between functional units and texture unit 936. In at least one embodiment, shared memory 970 can also be used as a program managed cache. In at least one embodiment, threads executing on GPGPU cores 962 can programmatically store data within shared memory in addition to automatically cached data that is stored within cache memory 972.

In at least one embodiment, a parallel processor or GPGPU as described herein is communicatively coupled to host/processor cores to accelerate graphics operations, machine-learning operations, pattern analysis operations, and various general purpose GPU (GPGPU) functions. In at least one embodiment, a GPU may be communicatively coupled to host processor/cores over a bus or other interconnect (e.g., a high-speed interconnect such as PCIe or NVLink). In at least one embodiment, a GPU may be integrated on a package or chip as cores and communicatively coupled to cores over an internal processor bus/interconnect internal to a package or chip. In at least one embodiment, regardless a manner in which a GPU is connected, processor cores may allocate work to such GPU in a form of sequences of commands/instructions contained in a work descriptor. In at least one embodiment, that GPU then uses dedicated circuitry/logic for efficiently processing these commands/instructions.

QoS policy evaluation manager 122 may be used to evaluate the optimality of a QoS policy used to provide an application session (e.g., a cloud gaming session) and make improvements thereto. Details regarding QoS policy evaluation manager 122 are provided herein in conjunction with FIG. 1. In at least one embodiment, QoS policy evaluation manager 122 may be used in the graphics multiprocessor 934 of FIG. 9D for evaluating the optimality of a QoS policy used to provide an application session (e.g., a cloud gaming session) and make improvements thereto.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one embodiment, use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). In at least one embodiment, number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (e.g., as a result of being executed) by one or more processors of a computer system, cause computer system to perform operations described herein. In at least one embodiment, set of non-transitory computer-readable storage media comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. In at least one embodiment, process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or interprocess communication mechanism.

Although descriptions herein set forth example implementations of described techniques, other architectures may be used to implement described functionality, and are intended to be within scope of this disclosure. Furthermore, although specific distributions of responsibilities may be defined above for purposes of description, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A method comprising:
capturing performance data for one or more frames of an application session associated with a client device, the application session being provided according to a first quality-of-service (QoS) policy;
detecting, based at least on the performance data, one or more characteristics of the application session having a performance indicator inconsistent with a second QoS policy;
determining at least one value for at least one characteristic of the one or more characteristics of the application session, the at least one value reflecting an impact of one or more external conditions on a respective characteristic of the application session;
computing a metric for the first QoS policy based at least on the at least one value determined for the at least one characteristic; and
modifying one or more values of one or more control parameters of the first QoS policy based at least on the metric.

2. The method of claim 1 comprising:
determining, for the at least one characteristic of the one or more characteristics, an amount of an inconsistency of a respective performance indicator with the second QoS policy based at least on the performance data;
computing, for the at least one characteristic, a probability that the inconsistency between the respective performance indicator and the second QoS policy resulted from the one or more external conditions;
determining the at least one value for the at least one characteristic based at least on the determined amount of the inconsistency and the probability.

3. The method of claim 2 wherein the amount of the inconsistency is determined based at least on a magnitude of the inconsistency and a frequency of occurrence of the inconsistency in a window of a subset of the one or more frames of the application session.

4. The method of claim 2 wherein the respective performance indicator of the at least one characteristic comprises at least one of: a video quality indicator, a latency indicator, or a stutter indicator.

5. The method of claim 1 wherein the determining the at least one value for the at least one characteristic comprises:
determining, for at least one frame of the one or more frames of the application session, a per-frame value for the at least one characteristic; and
computing the at least one value as a sum of two or more per-frame values.

6. The method of claim 1 wherein computing the metric comprises:
weighting the at least one value determined for the at least one characteristic of the one or more characteristics of the application session based at least on a user experience preset that defines a relative priority of the one or more characteristics to obtain at least one weighted value; and
computing the metric as a sum of two or more weighted values.

7. The method of claim 1 wherein the one or more control parameters affect an operation of one or more components of an application session pipeline.

8. A system comprising:
one or more processing units configured to perform operations comprising:
capturing performance data for one or more frames of an application session associated with a client device, the application session being provided according to a first quality-of-service (QoS) policy;
detecting, based at least on the performance data, one or more characteristics of the application session having a performance indicator inconsistent with a second QoS policy;
determining at least one value for at least one characteristic of the one or more characteristics of the application session, the at least one value reflecting an impact of one or more external conditions on a respective characteristic of the application session;
computing a metric for the first QoS policy based at least on the at least one value determined for the at least one characteristic; and
modifying one or more values of one or more control parameters of the first QoS policy based at least on the metric.

9. The system of claim 8, wherein the one or more processing units are configured to perform operations comprising:
determining, for the at least one characteristic, an amount of an inconsistency of a respective performance indicator with the second QoS policy based at least on the performance data;
computing, for the least one characteristic, a probability that the inconsistency between the respective performance indicator and the second QoS policy resulted from the one or more external conditions;
determining the at least one value for the at least one characteristic based at least on the determined amount of the inconsistency and the probability.

10. The system of claim 9, wherein the amount of the inconsistency is determined based at least on a magnitude of the inconsistency and a frequency of occurrence of the inconsistency in a window of a subset of the one or more frames of the application session.

11. The system of claim 9, wherein the respective performance indicator of the at least one characteristic comprises at least one of: a video quality indicator, a latency indicator, or a stutter indicator.

12. The system of claim 8, wherein the determining the value for at least one characteristic comprises:
determining, for at least one frame of the one or more frames of the application session, a per-frame value for the at least one characteristic; and
computing the at least one value as a sum of two or more per-frame values.

13. The system of claim 8, wherein computing the metric comprises:
weighting the at least one value determined for the one or more characteristics of the application session based at least on a user experience preset that defines a relative priority of the one or more characteristics to obtain at least one weighted value; and
computing the metric as a sum of two or more weighted values.

14. The system of claim 8, wherein the one or more control parameters affect an operation of one or more components of an application session pipeline.

15. The system of claim 8, wherein the system is comprised in at least one of:
a control system for an autonomous or semi-autonomous machine;
a perception system for an autonomous or semi-autonomous machine;
a system for performing simulation operations;
a system for performing digital twin operations;

a system for performing light transport simulation;
a system for performing collaborative content creation for 3D assets;
a system for presenting one or more of virtual reality content, augmented reality content, or mixed reality content;
a system for real-time streaming applications;
a system for performing deep learning operations;
a system implemented using an edge device;
a system implemented using a robot;
a system for performing conversational AI operations;
a system for generating synthetic data;
a system incorporating one or more virtual machines (VMs);
a system implemented at least partially in a data center; or
a system implemented at least partially using cloud computing resources.

16. A processor comprising:
one or more processing units to capture performance data for one or more frames of an application session executed using a client device and being provided according to a first quality-of-service (QoS) policy, detect one or more characteristics of the application session having a performance indicator inconsistent with a second QoS policy, determine at least one value reflecting an impact of one or more external conditions for at least one characteristic of the one or more characteristics of the application session, compute a metric for the first QoS policy based at least on the at least one value determined for the at least one characteristic, and modify one or more values of one or more control parameters of the first QoS policy based at least on the metric.

17. The processor of claim 16, wherein the one or more processing units are further to:
determine, for the at least one characteristic, an amount of an inconsistency of a respective performance indicator with the second QoS policy based at least on the performance data;
compute, for the at least one characteristic, a probability that the inconsistency between the respective performance indicator and the second QoS policy resulted from the one or more external conditions; and
determine the value for the at least one characteristic based at least on the determined amount of the inconsistency and the probability.

18. The processor of claim 17, wherein the respective performance indicator of the at least one characteristic comprises at least one of: a video quality indicator, a latency indicator, or a stutter indicator.

19. The processor of claim 16, wherein the amount of the inconsistency is determined based at least on a magnitude of the inconsistency and a frequency of occurrence of the inconsistency in a window of a subset of the one or more frames of the application session.

20. The processor of claim 16, wherein the one or more control parameters affect an operation of one or more components of an application session pipeline.

* * * * *